(12) United States Patent
Takeda

(10) Patent No.: US 10,373,274 B2
(45) Date of Patent: Aug. 6, 2019

(54) MANAGEMENT SYSTEM AND MANAGEMENT METHOD FOR A HAUL MACHINE

(71) Applicant: Komatsu Ltd., Tokyo (JP)

(72) Inventor: Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 619 days.

(21) Appl. No.: 14/362,160

(22) PCT Filed: Aug. 20, 2013

(86) PCT No.: PCT/JP2013/072225
§ 371 (c)(1),
(2) Date: Jun. 2, 2014

(87) PCT Pub. No.: WO2015/025372
PCT Pub. Date: Feb. 26, 2015

(65) Prior Publication Data
US 2015/0269685 A1 Sep. 24, 2015

(51) Int. Cl.
*G06Q 50/02* (2012.01)
*E02F 9/20* (2006.01)
(Continued)

(52) U.S. Cl.
CPC ............ *G06Q 50/02* (2013.01); *E02F 9/205* (2013.01); *E02F 9/2054* (2013.01);
(Continued)

(58) Field of Classification Search
None
See application file for complete search history.

(56) References Cited

U.S. PATENT DOCUMENTS 5,925,081 A * 7/1999 Hawkins ............... G05D 1/0297
701/24
5,961,560 A * 10/1999 Kemner ............... G05D 1/0297
701/24
(Continued)

FOREIGN PATENT DOCUMENTS

CA    2850076 A1    2/2013
CA    2815238 A1    5/2013
(Continued)

OTHER PUBLICATIONS

Office Action dated Oct. 26, 2015, issued for the corresponding Canadian patent application No. 2 878 098.
(Continued)

*Primary Examiner* — Thomas L Mansfield
(74) *Attorney, Agent, or Firm* — Locke Lord LLP

(57) ABSTRACT

A management system, includes: a first detection unit configured to detect position information of a first haul machine configured to travel along a haul road that leads to a loading area of a mine; a second detection unit configured to detect position information of a second haul machine configured to travel along the haul road; and a processing device configured to receive a detection result from each of the first detection unit and the second detection unit, wherein the processing device is configured to determine that the second haul machine arrives at an entrance of the loading area when the second haul machine arrives at a position behind the first haul machine that is in a standby state at the entrance based on the detection results.

8 Claims, 12 Drawing Sheets

(51) Int. Cl.
  *G06Q 99/00* (2006.01)
  *G06Q 10/06* (2012.01)
  *G01S 19/13* (2010.01)
(52) U.S. Cl.
  CPC ....... *G06Q 10/06312* (2013.01); *G06Q 99/00* (2013.01); *G01S 19/13* (2013.01)

(56) References Cited

U.S. PATENT DOCUMENTS

| | | | |
|---|---|---|---|
| 6,044,312 A | 3/2000 | Sudo et al. | |
| 6,114,993 A * | 9/2000 | Henderson | G01S 19/14 342/357.27 |
| 6,543,983 B1 * | 4/2003 | Felder | B23Q 7/1442 414/331.07 |
| 6,778,097 B1 * | 8/2004 | Kajita | E02F 3/437 340/12.5 |
| 6,799,100 B2 * | 9/2004 | Burns | G08G 1/207 340/436 |
| 8,144,245 B2 * | 3/2012 | Vik | E21C 41/26 348/424.1 |
| 8,170,756 B2 * | 5/2012 | Morey | E02F 3/6436 172/786 |
| 8,583,361 B2 | 11/2013 | Lewis et al. | |
| 8,868,302 B2 * | 10/2014 | Everett | E02F 9/2045 701/408 |
| 8,972,094 B2 | 3/2015 | Itoi et al. | |
| 9,157,754 B2 | 10/2015 | Lewis et al. | |
| 9,383,754 B2 * | 7/2016 | Takeda | G06Q 50/02 |
| 9,507,360 B2 * | 11/2016 | Tojima | B60M 7/00 |
| 2003/0069680 A1 | 4/2003 | Cohen et al. | |
| 2004/0039527 A1 * | 2/2004 | McDonald, Jr. | G01S 5/0027 701/469 |
| 2004/0040792 A1 * | 3/2004 | Uranaka | E21F 13/00 187/382 |
| 2004/0148083 A1 * | 7/2004 | Arakawa | G07C 5/008 701/50 |
| 2004/0158397 A1 | 8/2004 | Cho | |
| 2009/0216410 A1 * | 8/2009 | Allen | G05D 1/0212 701/50 |
| 2010/0201829 A1 * | 8/2010 | Skoskiewicz | G08G 1/04 348/211.2 |
| 2013/0054133 A1 | 2/2013 | Lewis et al. | |
| 2014/0100782 A1 | 4/2014 | Lewis et al. | |
| 2014/0122162 A1 * | 5/2014 | Baker | G06Q 10/06 705/7.27 |
| 2014/0146167 A1 * | 5/2014 | Friend | G01S 17/023 348/118 |
| 2014/0244098 A1 | 8/2014 | Ueda et al. | |
| 2014/0297091 A1 | 10/2014 | Itoi et al. | |
| 2015/0134184 A1 | 5/2015 | Takeda | |
| 2015/0285650 A1 | 10/2015 | Lewis et al. | |
| 2015/0292895 A1 | 10/2015 | Lewis et al. | |

FOREIGN PATENT DOCUMENTS

| | | |
|---|---|---|
| CA | 2882906 A1 | 2/2015 |
| CN | 1521675 A | 8/2004 |
| CN | 202996011 U | 6/2013 |
| CN | 103210153 A | 7/2013 |
| EP | 2353353 A1 | 8/2011 |
| JP | 08-263138 A | 10/1996 |
| JP | 2007-026212 A | 2/2007 |
| JP | 2009-002109 A | 1/2009 |
| JP | 2010-244247 A | 10/2010 |
| JP | 2013-105278 A | 5/2013 |
| WO | WO-2006/109828 A1 | 10/2006 |
| WO | WO-2009/065448 A1 | 5/2009 |
| WO | WO-2015/025371 A1 | 2/2015 |

OTHER PUBLICATIONS

Office Action dated Aug. 28, 2014, issued for the corresponding Australian patent application No. 2013350345.
International Search Report and Written Opinion dated Sep. 24, 2013, issued for PCT/JP2013/072225.

* cited by examiner

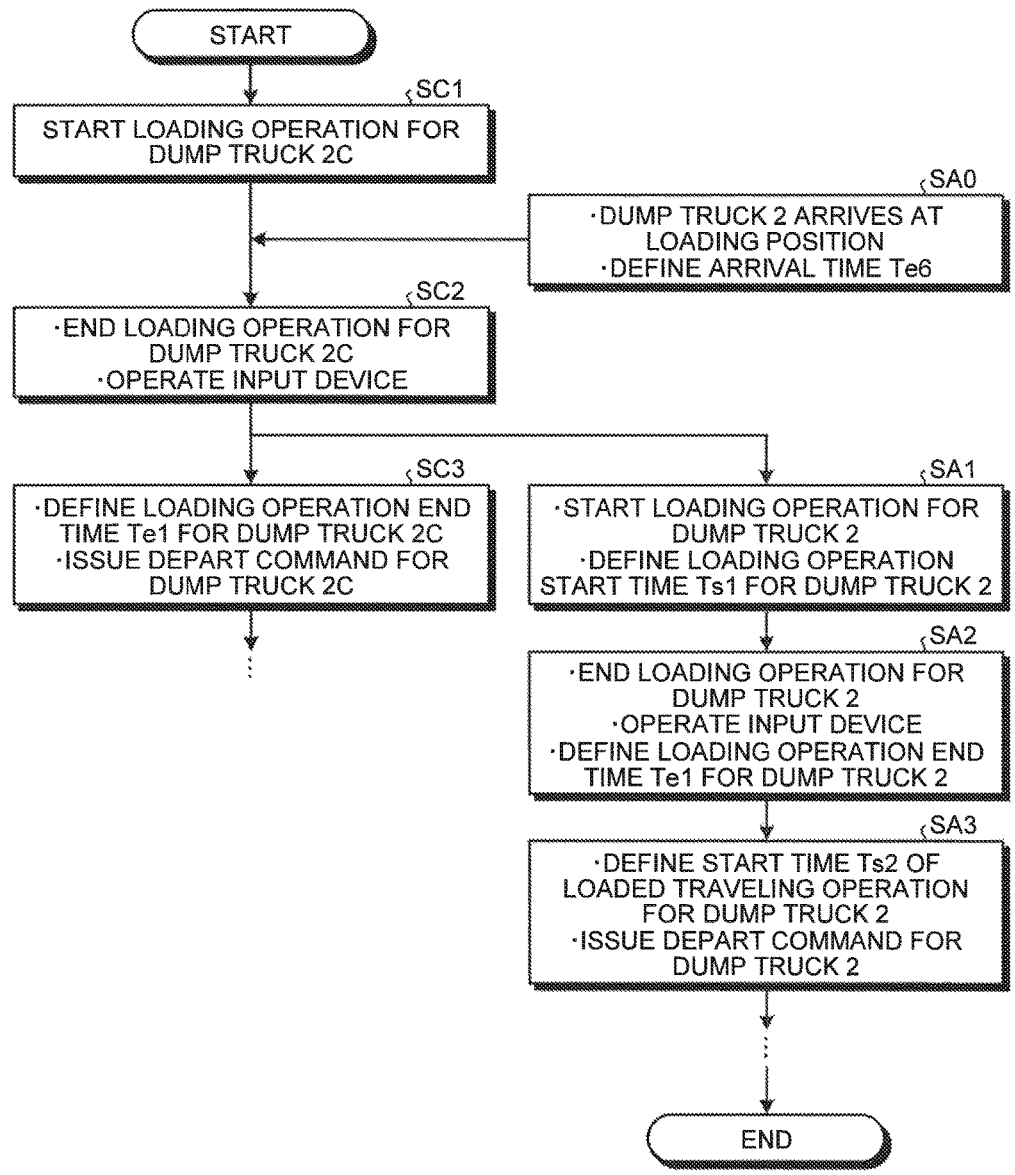

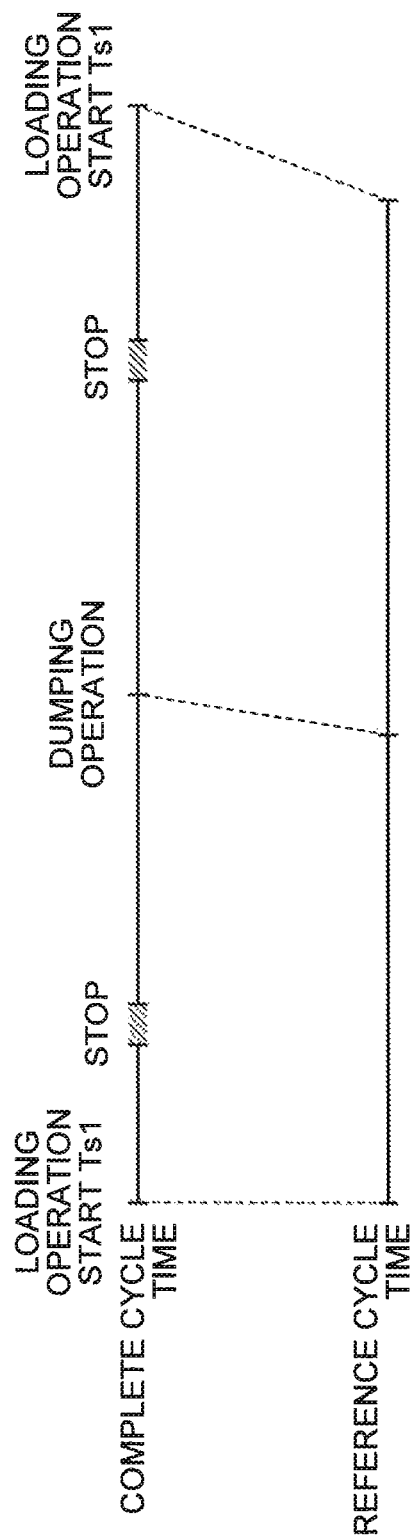

MANAGEMENT SYSTEM AND MANAGEMENT METHOD FOR A HAUL MACHINE

FIELD

The present invention relates to a management system and a management method for a mining machine.

BACKGROUND

At a mining site of a mine, mining machines such as a haul machine for transporting a loaded stuff and a loading machine for loading the stuff are operated. In Patent Literature 1, a technology on a management system for managing a loading operation by using an IC tag is described.

CITATION LIST

Patent Literature

Patent Literature 1: Japanese Laid-open Patent Publication No. 2009-002109

SUMMARY

Technical Problem

If the time required for various operations of the haul machine is not properly managed in a mine, for example, a proper assignment of the haul machine (assignment of vehicle) becomes difficult in the mine, and as a result, productivity in the mine is likely to be decreased.

It is an object of the present invention to provide a management system and a management method for a mining machine, which is configured to suppress decrease of productivity in a mine.

Solution to Problem

According to the present invention, a management system, comprises: a first detection unit configured to detect position information of a first haul machine configured to travel along a haul road that leads to a loading area of a mine; a second detection unit configured to detect position information of a second haul machine configured to travel along the haul road; and a processing device configured to receive a detection result from each of the first detection unit and the second detection unit, wherein the processing device is configured to determine that the second haul machine arrives at an entrance of the loading area when the second haul machine arrives at a position behind the first haul machine that is in a standby state at the entrance based on the detection results.

The processing device can define a time when the second haul machine arrives at the position behind the first haul machine as an arrival time of the second haul machine at the entrance.

The second haul machine can stop traveling when the second haul machine arrives at the position behind the first haul machine, stand by at the entrance of the loading area, and then move from the entrance to a loading position of the loading area, and the processing device can define a start time and an end time of an operation of the second haul machine moving to the loading position of the loading area after a standby state at a standby position of the entrance is released, based on the position information of the second haul machine outputted from the second detection unit.

The processing device can define a start time and an end time of at least one of an operation of the second haul machine traveling in a state in which a stuff is not loaded, an operation of a loading machine loading the stuff on the second haul machine at the loading position, and an operation of the second haul machine traveling in a state in which the stuff is loaded, based on the position information of the second haul machine outputted from the second detection unit.

The processing device can calculate a standby time of the second haul machine from the arrival time to a time when the standby state is released.

The processing device can calculate a time required for a cycle operation of the second haul machine that travels back and forth between the loading area and a dumping area where an operation of dumping the stuff is performed.

According to the present invention, a management method, comprises: detecting position information of a first haul machine configured to travel along a haul road that leads to a loading area of a mine; detecting position information of a second haul machine configured to travel along the haul road; and determining, when the second haul machine arrives at a position behind the first haul machine that is in a standby state at an entrance of the loading area, that the second haul machine arrives at the entrance based on the detection results of the position information of each of the first haul machine and the second haul machine.

According to the present invention, decrease of productivity in a mine is suppressed.

BRIEF DESCRIPTION OF DRAWINGS

FIG. 11 is a flowchart illustrating an example of an operation of a dump truck in one cycle according to the present embodiment.

FIG. 12 is a diagram illustrating a relationship between a complete cycle time and a reference cycle time.

DESCRIPTION OF EMBODIMENTS

Exemplary embodiments of the present invention are described below in detail with reference to the accompanying drawings. However, the present invention is not limited to the exemplary embodiments.

(Outline of Management System for Mining Machine)

Figure 1:
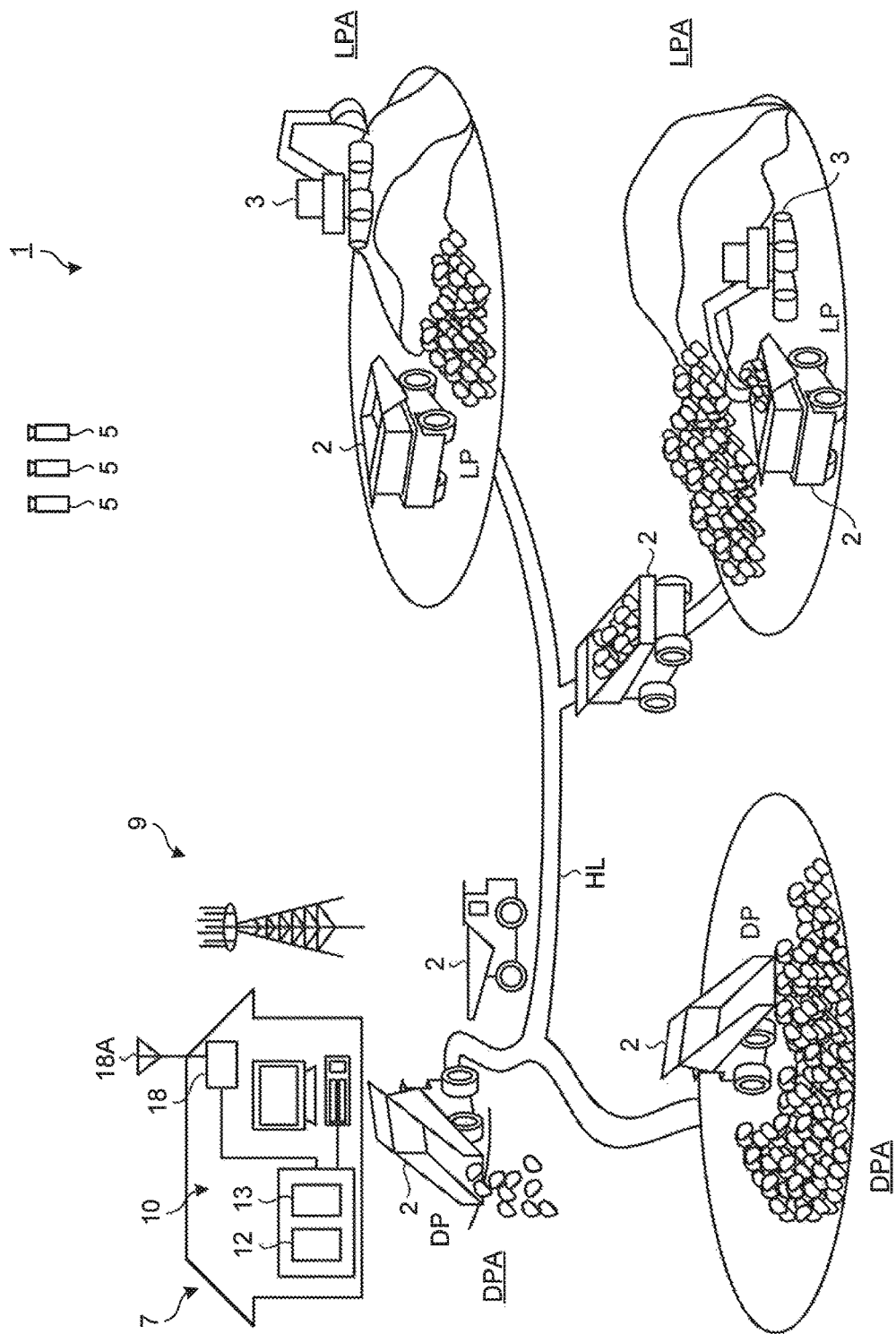
FIG. 1 is a diagram illustrating an example of a management system for managing a mining machine according to the present embodiment.

FIG. 1 is a schematic diagram illustrating a site where a mining machine management system 1 according to the present embodiment is employed. As illustrated in FIG. 1, the management system 1 includes a management apparatus 10 that is installed in a control facility 7 to perform a management of a mining machine and a communication system 9 that is configured to transfer information. The management system 1 manages an operation of the mining machine and evaluates productivity. The mining machine is a collective term of machinery used to perform various operations in a mine. In the present embodiment, an example in which a dump truck 2 that transports stuff such as soil generated by digging a mine as a haul machine, which is a sort of the mining machine, is managed is described. The dump truck 2 is a so-called unmanned dump truck that is operated by a command signal from the management apparatus 10, and hence no operator (driver) takes a ride in the dump truck 2. Further, the mining machine can include a loading machine 3 that loads stuff on the dump truck 2, such as an excavator.

In the mine, the dump truck 2 travels between a loading area LPA where an operation of loading the stuff is performed and a dumping area DPA where an operation of dumping the stuff is performed, along a haul road HL that connects the loading area LPA and the dumping area DPA. The loading machine 3 loads the stuff on the dump truck 2 at the loading area LPA. The dump truck 2 that is loaded with the stuff at a loading position LP of the loading area LPA moves to the dumping area DPA by traveling along the haul road HL, and dumps the stuff at a dumping position DP of the dumping area DPA. The dump truck 2 that dumped the stuff at the dumping area DPA moves to the loading area LPA by traveling along the haul road HL.

The communication system 9 includes a wireless communication system, and transfers information among the management apparatus 10, the dump truck 2, and the loading machine 3. The management apparatus 10, the dump truck 2, and the loading machine 3 are configured to communicate with one another in a wireless manner via the communication system 9.

In the present embodiment, a position of the dump truck 2 and a position of the loading machine 3 are detected by using a global positioning system (GPS). The GPS includes a GPS satellite 5, and detects a position on a coordinate system (GPS coordinate system) that defines latitude, longitude, and altitude. The position detected by the GPS includes coordinate data (coordinate value) of the latitude, the longitude, and the altitude. The position of the dump truck 2 and the position of the loading machine 3 in the mine are detected by the GPS. The position detected by the GPS is an absolute position defined on the GPS coordinate system. In the following descriptions, the position detected by the GPS is referred to as a GPS position as appropriate.

(Management Apparatus)

Figure 2:
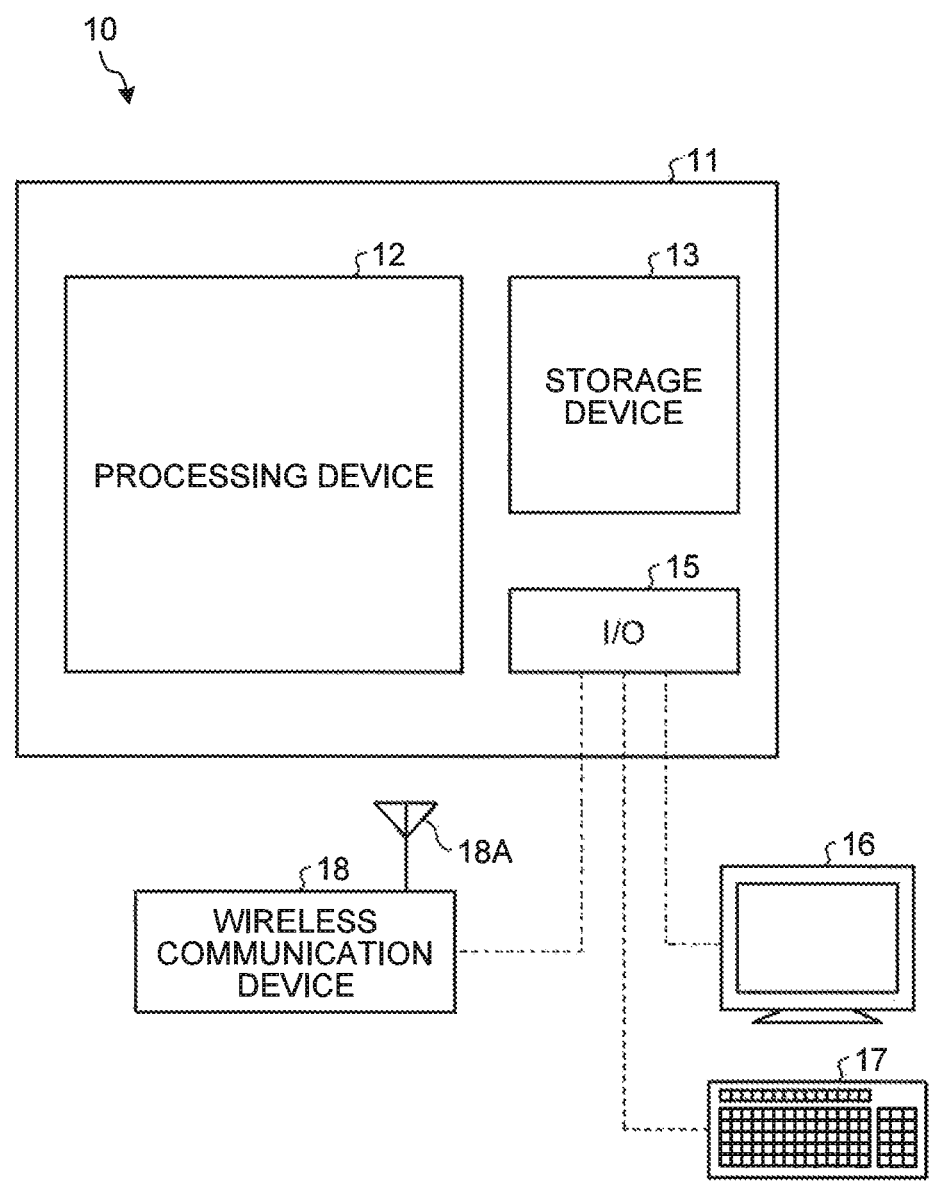
FIG. 2 is a diagram illustrating an example of a management system according to the present embodiment.

The management apparatus 10 installed in the control facility 7 is described below. FIG. 2 is a functional block diagram illustrating an example of the management apparatus 10 according to the present embodiment. As illustrated in FIGS. 1 and 2, the management apparatus 10 includes a computer system 11, a display device 16, an input device 17, and a wireless communication device 18.

The computer system 11 includes a processing device 12, a storage device 13, and an input/output unit 15. The display device 16, the input device 17 and the wireless communication device 18 are connected to the computer system 11 via the input/output unit 15. The input/output unit 15 is used for an input/output (interface) of information with at least one of the processing device 12, the display device 16, the input device 17, or the wireless communication device 18.

The processing device 12 includes a central processing unit (CPU), and executes various processes regarding the management of the dump truck 2. The processing device 12 processes information on the position of the dump truck 2 acquired via the communication system 9, and generates a traveling path CS along which the dump truck 2 travels. The traveling path CS is generated on the GPS coordinate system, and the dump truck 2 travels along the traveling path CS generated by the processing device 12 in at least a part of the loading area LPA, the dumping area DPA, and the haul road HL.

The storage device 13 includes at least one of a random access memory (RAM), a read only memory (ROM), a flash memory, or a hard disk drive, and stores various pieces of information regarding the management of the dump truck 2. The display device 16 includes, for example, a flat panel display such as a liquid crystal display, which is configured to display information on the position of the dump truck 2. The input device 17 includes at least one of a keyboard, a touch panel, a mouse, or an operation switch, and an operation signal is inputted by an operation of the input device 17. The operation signal inputted to the input device 17 is inputted to the processing device 12. That is, the input device 17 functions as an operation unit configured to input the operation signal to the processing device 12.

The communication system 9 includes the wireless communication device 18 that is installed in the control facility 7. The wireless communication device 18 includes an antenna 18A, and is connected to the processing device 12 via the input/output unit 15. The wireless communication device 18 is configured to receive information transmitted from at least one of the dump truck 2 or the loading machine 3 and to output the received information to the processing device 12. The information received by the wireless communication device 18 is stored (registered) in the storage device 13. Further, the wireless communication device 18 is configured to transmit information to at least one of the dump truck 2 or the loading machine 3. For example, information on the traveling path CS generated by the processing device 12 is transmitted to the dump truck 2 via the communication system 9.

(Dump Truck)

Figure 3:
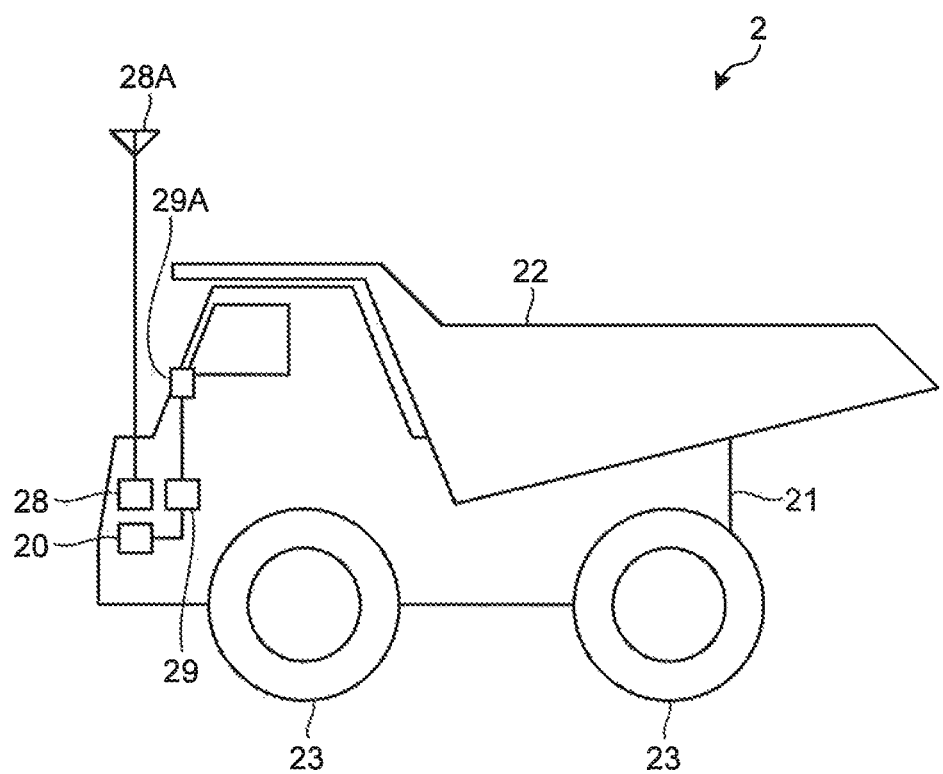
FIG. 3 is a diagram illustrating an example of a dump truck according to the present embodiment.
Figure 4:
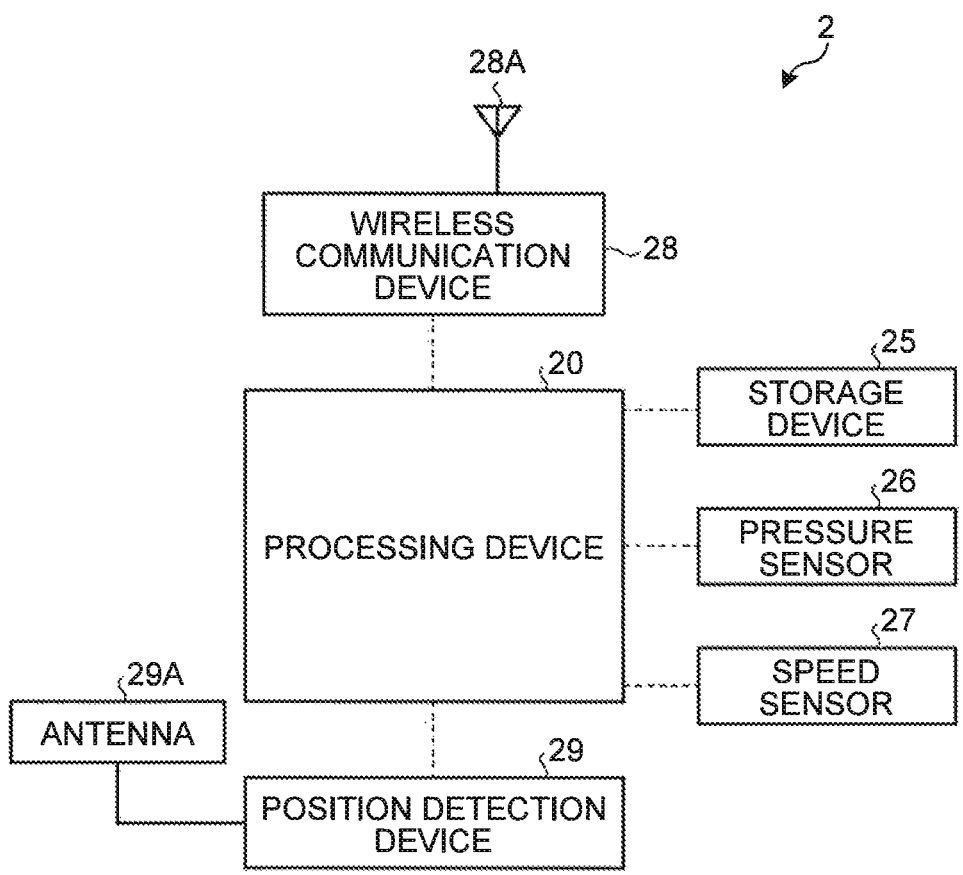
FIG. 4 is a diagram illustrating an example of a control system of a dump truck according to the present embodiment.

The dump truck 2 is described below. FIG. 3 is a schematic diagram illustrating an external appearance of the dump truck 2 according to the present embodiment, and FIG. 4 is a functional block diagram of the dump truck 2 according to the present embodiment. As illustrated in FIGS. 3 and 4, the dump truck 2 includes a vehicle body 21, a vessel 22, wheels 23, a processing device 20, a storage device 25, a pressure sensor 26, a speed sensor 27, a wireless communication device 28 to which an antenna 28A is connected, and a position detection device 29 to which an antenna 29A is connected.

A driving device including an internal-combustion engine is arranged in the vehicle body 21, and the wheels 23 are driven by the driving device. Each of the wheels 23 includes a tire and a wheel, and is rotated by a driving force transmitted from the driving device.

The vessel 22 includes a loading platform for loading the stuff, and is swingably arranged over the vehicle body 21. In a loading operation, the stuff is loaded on the vessel 22 by the loading machine 3, and in a dumping operation, the vessel 22 is elevated such that the stuff is dumped.

The pressure sensor 26 works as a load sensor that detects a load exerted on a suspension cylinder and performs a detection of presence and absence of the stuff on the vessel 22 and a detection of a weight (load amount) of the stuff by detecting a pressure of an operating oil of the suspension cylinder. The pressure sensor 26 is connected to the processing device 20, and outputs a detection signal to the processing device 20.

The speed sensor 27 detects a traveling speed of the dump truck 2 by detecting a rotation speed of the wheels 23. The speed sensor 27 is connected to the processing device 20, and outputs a detection signal to the processing device 20.

The position detection device 29 includes a GPS receiver, and detects a GPS position of the dump truck 2. The position detection device 29 includes the GPS antenna 29A arranged on the dump truck 2, and detects the GPS position of the dump truck 2 by detecting a GPS position of the antenna 29A. The position detection device 29 is connected to the processing device 20, and outputs a detection signal to the processing device 20.

The processing device 20 includes a central processing unit (CPU), and executes various processes regarding a management of the dump truck 2. The processing device 20 controls traveling of the dump truck 2 in a manner that the dump truck 2 travels along the traveling path CS generated by the processing device 12. The control of the traveling of the dump truck 2 includes a control of an operation of the dump truck 2, which includes at least one of an operation of a steering wheel, an operation of an accelerator, or an operation of a brake.

The storage device 25 includes at least one of a random access memory (RAM), a read only memory (ROM), a flash memory, or a hard disk drive, and stores therein various pieces of information on the management of the dump truck 2.

The communication system 9 includes the wireless communication device 28 arranged in the dump truck 2. The wireless communication device 28 includes the antenna 28A, and is connected to the processing device 20. The wireless communication device 28 is configured to receive information (including a command signal) transmitted from at least one of the management apparatus 10 or the loading machine 3, and output the received information to the processing device 20. The information received by the wireless communication device 28 is stored (registered) in the storage device 25. The processing device 20 is configured to control the traveling of the dump truck 2 based on the command signal received by the wireless communication device 28. Further, the wireless communication device 28 is configured to transmit information to at least one of the management apparatus 10 or the loading machine 3. For example, a detection signal from at least one of the pressure sensor 26, the speed sensor 27, or the position detection device 29 is transmitted to the management apparatus 10 via the communication system 9.

(Loading Machine)

Figure 5:
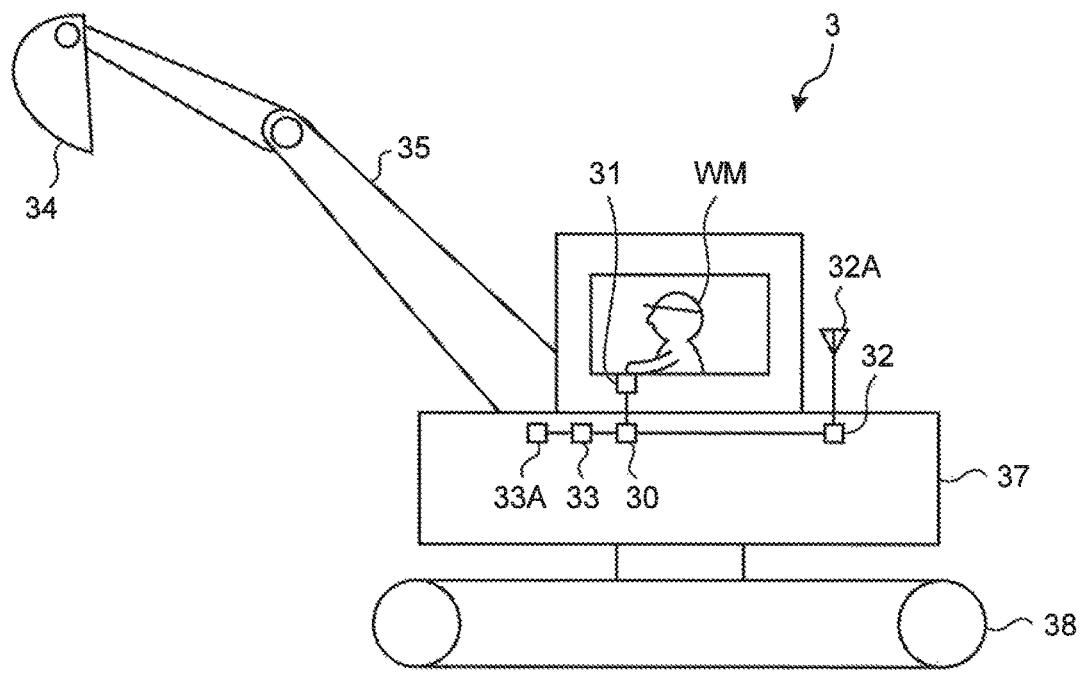
FIG. 5 is a diagram illustrating a loading machine according to the present embodiment.
Figure 6:
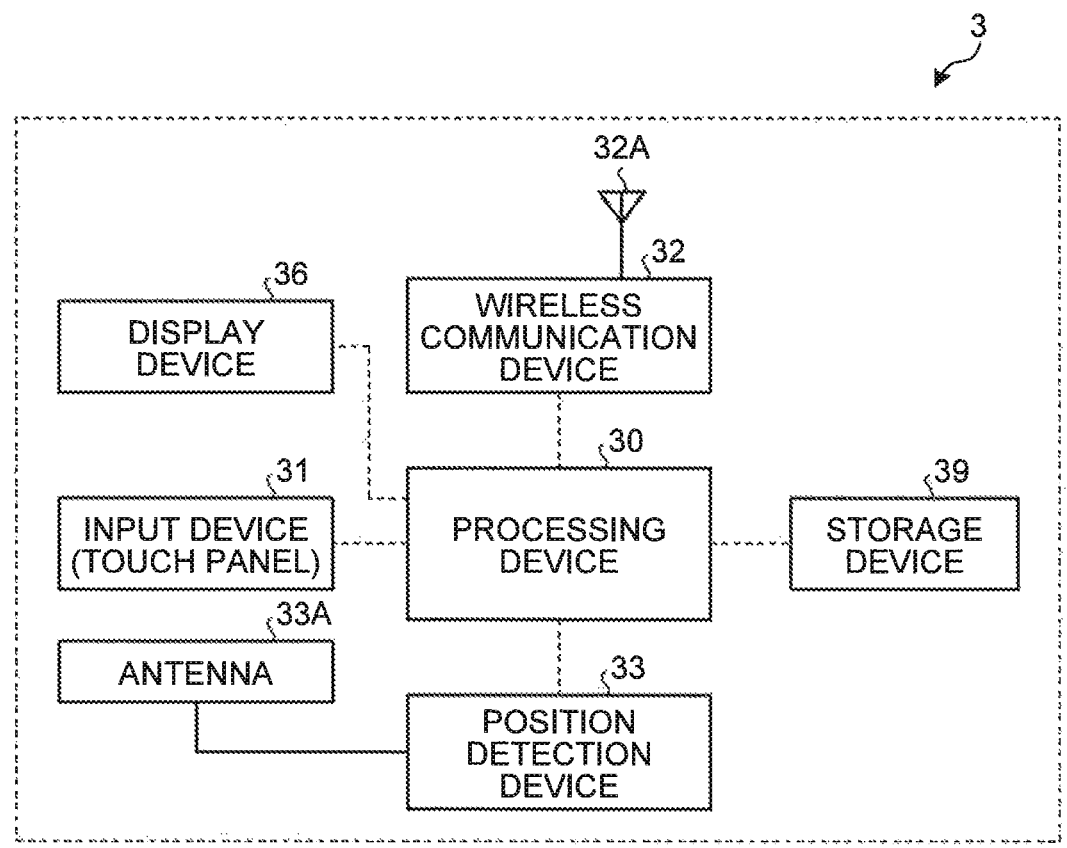
FIG. 6 is a diagram illustrating an example of a control system of a loading machine according to the present embodiment.

The loading machine 3 is described below. FIG. 5 is a schematic diagram illustrating an outer appearance of the loading machine 3 according to the present embodiment, and FIG. 6 is a functional block diagram of the loading machine 3 according to the present embodiment. As illustrated in FIGS. 5 and 6, the loading machine 3 is an excavator including a traveling member 38, a rotary body 37, an arm 35, a bucket 34, a processing device 30, a storage device 39, a wireless communication device 32 to which an antenna 32A is connected, a position detection device 33 to which an antenna 33A is connected, a display device 36, and an input device 31. In the present embodiment, an operator WM takes a ride in the loading machine 3, and the loading operation is performed by an operation of the operator WM. Although an example of using an excavator as the loading machine 3 is described in the present embodiment, a wheel loader can also be used as the loading machine 3.

The position detection device 33 includes a GPS receiver, and detects a GPS position of the loading machine 3. The position detection device 33 includes the GPS antenna 33A arranged on the loading machine 3, and detects the GPS position of the loading machine 3 by detecting a GPS position of the antenna 33A. The position detection device 33 is connected to the processing device 30, and outputs a detection signal to the processing device 30.

The processing device 30 includes a central processing unit (CPU), and executes various processes regarding the management of the loading operation of the loading machine 3. The storage device 39 includes at least one of a random access memory (RAM), a read only memory (ROM), a flash memory, or a hard disk drive, and stores various pieces of information regarding the management of the loading operation of the loading machine 3. The display device 36 includes, for example, a flat panel display such as a liquid crystal display, which is configured to display at least one of information on the position of the dump truck 2, information on the position of the loading machine 3, or information on an operation state (for example, water temperature of the engine) of the loading machine 3.

The input device 31 includes at least one of a keyboard, a touch panel, or an operation switch, and an operation signal is generated by an operation of the input device 31. The operation signal generated by the input device 31 is inputted to the processing device 30. That is, the input device 31 functions as an operation unit configured to input the operation signal to the processing device 30. The operator (driver) WM of the loading machine 3 can generate the operation signal by operating the input device 31, and can input the operation signal to the processing device 30 via the input device 31.

The communication system 9 includes the wireless communication device 32 that is installed in the loading machine 3. The wireless communication device 32 includes the antenna 32A, and is connected to the processing device 30. The wireless communication device 32 is configured to receive information (including a command signal) transmitted from at least one of the management apparatus 10 or the dump truck 2 and to output the received information to the processing device 30. The information received by the wireless communication device 32 is stored (registered) in the storage device 39. Further, the wireless communication device 32 is configured to transmit information to at least one of the management apparatus 10 or the dump truck 2. For example, the operation signal generated by the input device 31 is transmitted to the management apparatus 10 or the dump truck 2 via the communication system 9.

(Operation of Dump Truck 2)

An example of an operation of the dump truck 2 is described below. The dump truck 2 repeats a series of operations in which the dump truck 2 departs the loading area LPA toward the dumping area DPA after the loading operation loading the stuff by the loading machine 3 is performed at the loading position LP of the loading area LPA of the mine, performs the dumping operation of the stuff at the dumping position DP of the dumping area DPA after arriving at the dumping area DPA by traveling along the haul road HL, departs the dumping area DPA toward the loading area LPA after performing the dumping operation, performs a loading operation at the loading position DP after arriving at the loading area LPA by traveling along the haul road HL, and departs the loading area LPA toward the dumping area DPA again.

The loading area LPA is an area (site) where an operation of loading the stuff is performed in the mine, the loading position LP is a position (loading point) where the operation of loading the stuff is performed at the loading area LPA, and the loading operation is an operation of loading the stuff on the dump truck 2. The dumping area DPA is an area (site) where an operation of dumping the stuff is performed in the mine, the dumping position DP is a position (dumping point) where the operation of dumping the stuff is performed at the dumping area DPA, and the dumping operation is an operation of dumping the stuff from the dump truck 2. The haul road HL connects the loading area LPA and the dumping area DPA, and the dump truck 2 is configured to travel back and forth between the loading area LPA and the dumping area DPA by traveling along the haul road HL. In the present embodiment, the loading position LP and the dumping position DP are defined by the processing device 12. Each of the loading position LP and the dumping position DP can be a position of a part of the traveling path CS generated by the processing device 12.

In the following description, a series of operations of the dump truck 2 including departing the loading area LPA, arriving at the loading area LPA via the dumping area DPA where the stuff is dumped, and departing the loading area LPA again is referred to as a cycle operation as appropriate, and one cycle operation is referred to as one cycle as appropriate. The cycle operation includes an operation of the dump truck 2 traveling back and forth between the loading area LPA and the dumping area DPA.

However, the definition of one cycle is not limited to this, but, for example, a series of operation including arriving at the loading area LPA, performing the loading operation and the dumping operation at the dumping area DPA, and arriving at the loading area LPA again can be defined as one cycle, or alternatively, a series of operation including departing the dumping area DPA and departing the dumping area DPA again via the loading area LPA can also be defined as one cycle. When a first loading operation is performed and then a second loading operation is performed after one cycle operation, the loading position LP for the first loading operation and the loading position LP for the second loading operation can be the same position or can be different positions from each other. Further, when a first dumping operation is performed and then a second dumping operation is performed after one cycle operation, the dumping position DP for the first dumping operation and the dumping position DP for the second dumping operation can be the same position or can be different positions from each other.

Further, there may be a plurality of loading areas LPA or a plurality of dumping areas DPA in the mine, as illustrated in FIG. 1. When a first loading operation is performed and then a second loading operation is performed after one cycle operation, the loading area LPA for the first loading operation and the loading area LPA for the second loading operation can be the same loading area LPA or can be different loading areas LPA from each other. Further, when a first dumping operation is performed and then a second dumping operation is performed after one cycle operation, the dumping area DPA for the first dumping operation and the dumping area DPA for the second dumping operation can be the same dumping area DPA or can be different dumping areas DPA from each other.

In the cycle operation, the dump truck 2 performs a plurality of operations. The plurality of operations of the dump truck 2 includes, for example, at least one of a dumping operation of performing an operation of dumping the stuff at the dumping area DPA, an unloaded traveling operation in which the dump truck 2 travels to the entrance of the loading area LPA in an empty state in which no stuff is loaded after the dumping operation at the dumping area DPA, an entrance standby operation in which the dump truck 2 stands by at the entrance after arriving at the entrance of the loading area LPA, a spot operation in which the dump truck 2 moves to the loading position LP of the loading area LPA after a standby state at a standby position of the entrance of the loading area LPA is released, a loading operation in which the stuff is loaded by the loading machine 3 at the loading position LP, or a loaded traveling operation in which the dump truck 2 travels in a loaded state with the stuff loaded from the loading area LPA to the dumping area DPA. The plurality of operations of the dump truck 2 further includes a traveling stop operation of stopping the traveling on the haul road HL.

In at least a part of the cycle operation, the position information of the dump truck 2 is detected by using the GPS. That is, the GPS position of the dump truck 2 is detected by the position detection device 29 including the GPS receiver arranged in the dump truck 2. The information on the GPS position of the dump truck 2 detected by the position detection device 29 is outputted to the processing device 12 of the management apparatus 10 via the communication system 9.

In the present embodiment, the processing device 12 defines one or both of a start time and an end time of at least one operation among the above-mentioned plurality of operations of the dump truck 2 based on the position information of the dump truck 2 outputted from the position detection device 29. For example, the processing device 12 defines a start time and an end time of the dumping operation, a start time and an end time of the unloaded traveling operation, a start time and an end time of the entrance standby operation, a start time and an end time of the spot traveling operation, a start time and an end time of the loading operation, a start time and an end time of the loaded traveling operation, and a start time and an end time of the traveling stop operation based on the GPS position of the dump truck 2 outputted from the position detection device 29.

Further, the processing device 12 is configured to derive the time required for an operation of the dump truck 2 based on the start time and the end time of the operation. The processing device 12 is configured to derive a dumping operation time required for the dumping operation of the dump truck 2 based on the start time and the end time of the dumping operation, to derive an unloaded traveling time for which the dump truck 2 travels in a state in which no stuff is loaded based on the start time and the end time of the unloaded traveling operation, to derive an entrance standby time for which the dump truck 2 stands by at the entrance of the loading area LPA based on the start time and the end time of the entrance standby operation, to derive a spot time required for the dump truck 2 to move to the loading position LP of the loading area LPA after the standby state at the standby position of the entrance of the loading area LPA is released, to derive a loading operation time required for the dump truck 2 to perform the loading operation based on the start time and the end time of the loading operation, to derive a loaded traveling time for which the dump truck 2 travels in a state in which the stuff is loaded based on the start time and the end time of the loaded traveling operation, and to derive a stop time at which the dump truck 2 stops traveling on the haul road HL based on the start time and the end time of the traveling stop operation.

In the mine, a plurality of dump trucks 2 is operated, and each of the plurality of dump trucks 2 performs the cycle operation. The information on the GPS position of each of the dump trucks 2 is outputted to the processing device 12 of the management apparatus 10 via the communication system 9. The processing device 12 defines the start time and the end time of each operation of each of the plurality of dump trucks 2 based on the position information of each of the plurality of dump trucks 2, and derives the time required for the operation.

(Operations of Dump Truck and Loading Machine in One Cycle)

Figure 7:
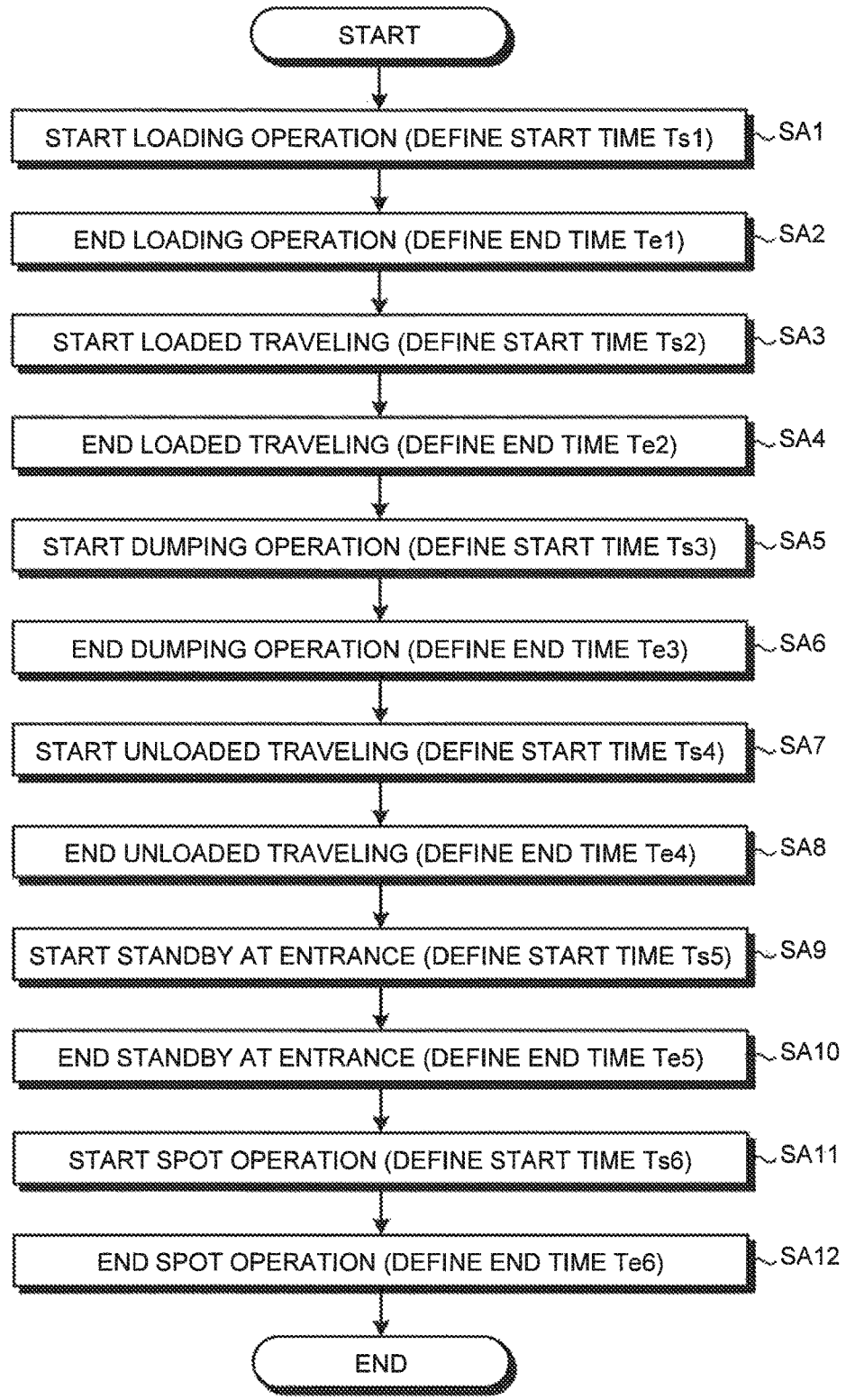
FIG. 7 is a flowchart illustrating an example of an operation of a dump truck in one cycle according to the present embodiment.
Figure 8:
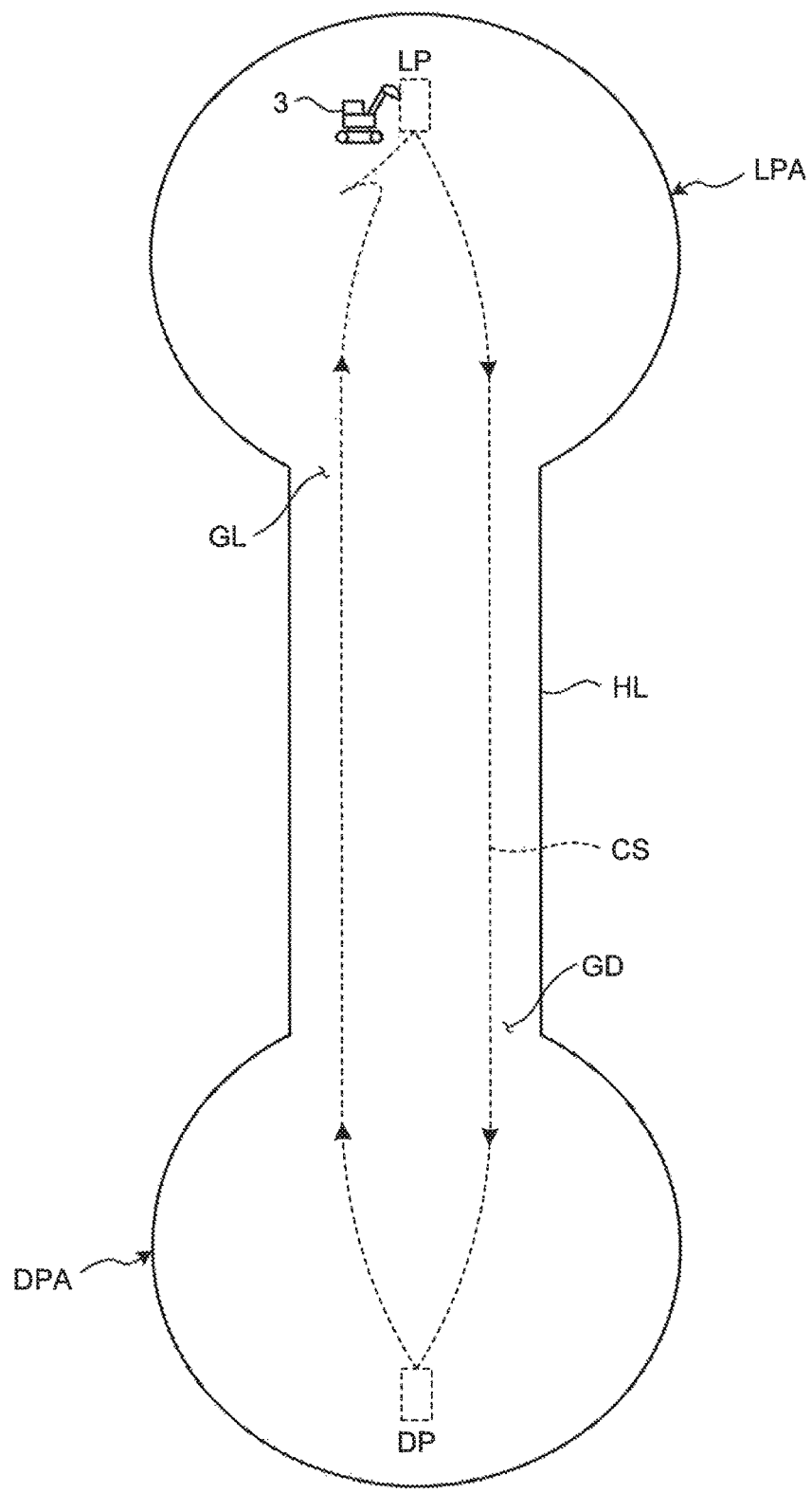
FIG. 8 is a schematic diagram illustrating an example of an operation of a dump truck in one cycle according to the present embodiment.

An example of the operations of the dump truck 2 in one cycle is described below with reference to a flowchart of FIG. 7 and a schematic diagram of FIG. 8.

A loading operation for the dump truck 2 arranged at the loading position LP of the loading area LPA is started (Step SA1). The information on the GPS position of the dump truck 2 when the loading operation is performed at the loading position LP is outputted to the processing device 12 of the management apparatus 10 via the communication system 9.

In the present embodiment, the processing device 12 defines the time when the dump truck 2 is arranged at the loading position LP as a start time Ts1 of the loading operation of the dump truck 2. As described above, the dump truck 2 travels along the traveling path CS generated by the processing device 12, and the traveling path CS includes the loading position LP. That is, the loading position LP is defined by the processing device 12 on the GPS coordinate system, and the processing device 12 is configured to determine whether or not the dump truck 2 is arranged at the loading position LP, based on the information on the GPS position of the dump truck 2 outputted from the position detection device 29. The processing device 12 determines whether the dump truck 2 is arranged at the loading position LP based on the traveling path CS (loading position LP) generated by the processing device 12 and a detection result of the position detection device 29, and defines the time when the dump truck 2 is arranged at the loading position LP as the start time Ts1 of the loading operation of the dump truck 2.

When the loading operation is ended, the input device 31 is operated by the operator WM of the loading machine 3 (Step SA2). The input device 31 includes a touch panel, and the touch panel includes an operation unit (input button) for notifying the dump truck 2 and the management apparatus 10 of the completion of the loading operation. The operator WM operates the operation unit (presses the input button) when the loading operation is ended. An operation signal generated by the input device 31 is outputted to the processing device 12 of the management apparatus 10 and the processing device 20 of the dump truck 2 via the communication system 9.

In the present embodiment, the processing device 12 defines an end time Te1 of the loading operation of the dump truck 2 based on the operation signal generated by the input device 31 when the loading operation is ended. Further, the processing device 12 can define the time when the operation signal is generated by the input device 31 in a state in which the dump truck 2 is at the loading position LP as the end time Te1. That is, the end time Te1 can be the time when the input device 31 is operated to generate the operation signal (time when the operation signal is inputted to the processing device 12) in a state in which the loading position LP defined by the processing device 12 and the GPS position of the dump truck 2 detected by the position detection device 29 match each other.

In the present embodiment, the operation signal generated by the input device 31 includes a command signal to the dump truck 2 to depart from the loading position LP. When the operation signal generated by the input device 31 is inputted to the processing device 20 of the dump truck 2 via the communication system 9, the dump truck 2 departs from the loading position LP toward the dumping area DPA. Further, the processing device 12 of the management apparatus 10 that received the operation signal from the input device 31 can instruct the dump truck 2 to depart from the loading position LP via the communication system 9.

Further, the processing device 12 can define the end time Te1 based on the position information of the dump truck 2 outputted from the position detection device 29. When the loading operation is ended and the dump truck 2 starts traveling, the position of the dump truck 2 is changed, and hence the processing device 12 can determine whether or not the dump truck 2 has departed from the loading position LP, based on the information on the GPS position of the dump truck 2 outputted from the position detection device 29. The processing device 12 can determine whether or not the dump truck 2 has started moving from the loading position LP, based on the detection result of the position detection device 29, and define the time when the dump truck 2 started moving from the loading position LP as the end time Te1 of the loading operation of the dump truck 2.

After the loading operation is ended, the dump truck 2 starts the loaded traveling operation (Step SA3). In the present embodiment, the processing device 12 defines a start time Ts2 of the loaded traveling operation of the dump truck 2 based on the operation signal generated by the input device 31 when the loading operation is ended. That is, in the present embodiment, the start time Ts2 of the loaded traveling operation is the time when the input device 31 is operated to generate the operation signal (time when the operation signal is inputted to the processing device 12), which is the same as the end time Te1 of the loading operation. Further, the processing device 12 can determine whether or not the dump truck 2 has started moving from the loading position LP based on the detection result of the position detection device 29, and define the time when the dump truck 2 started moving from the loading position LP as the start time Ts2 of the loaded traveling operation of the dump truck 2. Further, the processing device 12 can define the time when the operation signal is generated by the input device 31 when the loading operation is ended as the end time Te1, and define the time when it is determined that the dump truck 2 has started moving from the loading position LP based on the detection result of the position detection device 29 as the start time Ts2.

The dump truck 2 travels along the traveling path CS generated by the processing device 12 in a loaded state, and arrives at an entrance GD of the dumping area DPA. The dump truck 2 that has arrived at the entrance GD of the dumping area DPA enters the dumping area DPA from the entrance GD, travels toward the dumping position DP and arrives at the dumping position DP (Step SA4). In the present embodiment, the processing device 12 defines the time when the dump truck 2 is arranged at the dumping position DP as an end time Te2 of the loaded traveling operation of the dump truck 2. As described above, the dump truck 2 travels along the traveling path CS generated by the processing device 12, and the traveling path CS includes the dumping position DP. That is, the dumping position DP is defined by the processing device 12 on the GPS coordinate system, and the processing device 12 is configured to determine whether or not the dump truck 2 is arranged at the dumping position DP based on the information on the GPS position of the dump truck 2 outputted from the position detection device 29. The processing device 12 determines whether or not the dump truck 2 is arranged at the dumping position DP based on the traveling path CS (dumping position DP) generated by the processing device 12 and the detection result of the position detection device 29, and defines the time when the dump truck 2 is arranged at the dumping position DP as the end time Te2 of the loaded traveling operation of the dump truck 2.

Further, there may be an intersect on the haul road HL from the loading area LPA to the dumping area DPA. In such a case, the processing device 12 can divide the loaded traveling operation of the dump truck 2 into a first loaded traveling operation from the loading area LPA to an intersect of the haul road HL and a second loaded traveling operation from the intersect of the haul road HL to the dumping area DPA and define a start time and an end time of the first loaded traveling operation of the dump truck 2 and a start time and an end time of the second loaded traveling operation of the dump truck 2. One or both of the end time of the first loaded traveling operation and the start time of the second loaded traveling operation includes the time when the dump truck 2 passed the intersect of the haul road HL, and can be defined based on the GPS position of the dump truck 2. Further, when the haul road HL is split from the intersect of the haul road HL to haul road HL that leads to a first dumping area DPA and a haul road HL that leads to a second dumping area DPA, the processing device 12 can divide the loaded traveling operation of the dump truck 2 into a third loaded traveling operation from the intersect of the haul road HL to the first dumping area DPA and a fourth loaded traveling operation from the intersect of the haul road HL to the second dumping area DPA, and define a start time and an end time of the third loaded traveling operation of the dump truck 2 and a start time and an end time of the fourth loaded traveling operation of the dump truck 2. One or both of the start time of the third loaded traveling operation and the start time of the fourth loaded traveling operation includes the time when the dump truck 2 passed the intersect of the haul road HL, and can be defined based on the GPS position of the dump truck 2.

After the loaded traveling operation is ended, the dump truck 2 starts the dumping operation (Step SA5). The processing device 12 outputs (transmits) a dumping operation command signal to the dump truck 2 that is arranged at the dumping position DP. The processing device 20 of the dump truck 2 that received the command signal elevates the vessel 22. With this operation, the stuff is dumped from the vessel 22 (Step SA6). When the stuff is dumped from the vessel 22 so that the dumping operation is ended, the dump truck 2 departs from the dumping position DP toward the loading area LPA.

In the present embodiment, the processing device 12 defines the time when the dump truck 2 is arranged at the dumping position DP as a start time Ts3 of the dumping operation of the dump truck 2. That is, in the present embodiment, the start time Ts3 of the dumping operation is the same as the end time Te2 of the loaded traveling operation, and hence the end time Te2 is defined as the start time Ts3. Further, as the time required for the dumping operation is as short as a few seconds, in the present embodiment, the processing device 12 defines the start time Ts3 of the dumping operation as an end time Te3 of the dumping operation. That is, in the present embodiment, the end time Te3 of the dumping operation is the same as the start time Ts3 of the dumping operation. Further, the processing device 12 can define the time when the elevation of the vessel 22 is started by an output of the dumping operation command signal as the start time Ts3 of the dumping operation.

Further, the processing device 12 can define the end time Te2 and the start time Ts3 to be different from each other. For example, the processing device 12 can define the time when the dump truck 2 is arranged at the dumping position DP as the end time Te2, and define the time when the elevation of the vessel 22 is started as the start time Ts3. Moreover, the processing device 12 can define the start time Ts3 and the end time Te3 to be different from each other. For example, the processing device 12 can define the time when the dumping operation command signal is outputted or the time when the elevation of the vessel 22 is started as the start time Ts3, and define the time when it is determined that the dumping of the stuff is completed as the end time Te3 based on the detection result of the pressure sensor 26 that can detect the weight of the stuff in the vessel 22.

In addition, the processing device 12 can define the end time Te3 of the dumping operation of the dump truck 2 based on the position information of the dump truck 2 outputted from the position detection device 29. When the dumping operation is ended and the dump truck 2 starts traveling, the position of the dump truck 2 is changed, and hence the processing device 12 can determine whether or not the dump truck 2 has departed from the dumping position DP based on the information on the GPS position of the dump truck 2 outputted from the position detection device 29. The processing device 12 can determine whether or not the dump truck 2 has started moving from the dumping position DP based on the detection result of the position detection device 29, and define the time when the dump truck 2 started moving from the dumping position DP as the end time Te3 of the dumping operation of the dump truck 2.

After the dumping operation is ended, the dump truck 2 starts the unloaded traveling operation (Step SA7). In the present embodiment, as the time required for the dumping operation is short, the start time Ts3 (or the end time Te3) of the dumping operation is defined as a start time Ts4 of the unloaded traveling operation. That is, in the present embodiment, the start time Ts3, the end time Te3, and the start time Ts4 are the same. However, the start time Ts3 (or the end time Te3) and the start time Ts4 can be different from each other.

Further, the processing device 12 can define the start time Ts4 of the unloaded traveling operation of the dump truck 2 based on the position information of the dump truck 2 outputted from the position detection device 29. The processing device 12 can determine whether or not the dump truck 2 has started moving from the dumping position DP based on the detection result of the position detection device 29, and define the time when the dump truck 2 has started moving the dumping position DP as the start time Ts4 of the unloaded traveling operation of the dump truck 2.

The dump truck 2 travels along the traveling path CS generated by the processing device 12 in an unloaded state, and arrives at the entrance GL of the loading area LPA. With this operation, the dump truck 2 ends the unloaded traveling operation on the haul road HL (Step SA8). In the present embodiment, the processing device 12 defines the time when the dump truck 2 has arrived at the entrance GL of the loading area LPA as an end time Te4 of the unloaded traveling operation of the dump truck 2. As described above, the dump truck 2 travels along the traveling path CS generated by the processing device 12, and the traveling path CS includes the position of the entrance GL. That is, the position of the entrance GL is defined by the processing device 12 on the GPS coordinate system, and the processing device 12 can determine whether or not the dump truck 2 has arrived at the entrance GL based on the information on the GPS position of the dump truck 2 outputted from the position detection device 29. The processing device 12 determines whether or not the dump truck 2 has arrived at the entrance GL based on the traveling path CS (the position of the entrance GL) generated by the processing device 12 and the detection result of the position detection device 29, and defines the time when the dump truck 2 has arrived at the entrance GL as the end time Te4 of the unloaded traveling operation of the dump truck 2.

Further, there may be an intersect on the haul road HL from the dumping area DPA to the loading area LPA. In such a case, the processing device 12 can divide the unloaded traveling operation of the dump truck 2 into a first unloaded traveling operation from the dumping area DPA to an intersect of the haul road HL and a second unloaded traveling operation from the intersect of the haul road HL to the loading area LPA and define a start time and an end time of the first unloaded traveling operation of the dump truck 2 and a start time and an end time of the second unloaded traveling operation of the dump truck 2. One or both of the end time of the first unloaded traveling operation and the start time of the second unloaded traveling operation includes the time when the dump truck 2 passed the intersect of the haul road HL, and can be defined based on the GPS position of the dump truck 2. Further, when the haul road HL is split from the intersect of the haul road HL to a haul road HL that leads to a first loading area LPA and a haul road HL that leads to a second loading area LPA, the processing device 12 can divide the unloaded traveling operation of the dump truck 2 into a third unloaded traveling operation from the intersect of the haul road HL to the first loading area LPA and a fourth unloaded traveling operation from the intersect of the haul road HL to the second loading area LPA, and define a start time and an end time of the third unloaded traveling operation of the dump truck 2 and a start time and an end time of the fourth unloaded traveling operation of the dump truck 2. One or both of the start time of the third unloaded traveling operation and the start time of the fourth unloaded traveling operation includes the time when the dump truck 2 passed the intersect of the haul road HL, and can be defined based on the GPS position of the dump truck 2.

Figure 9:
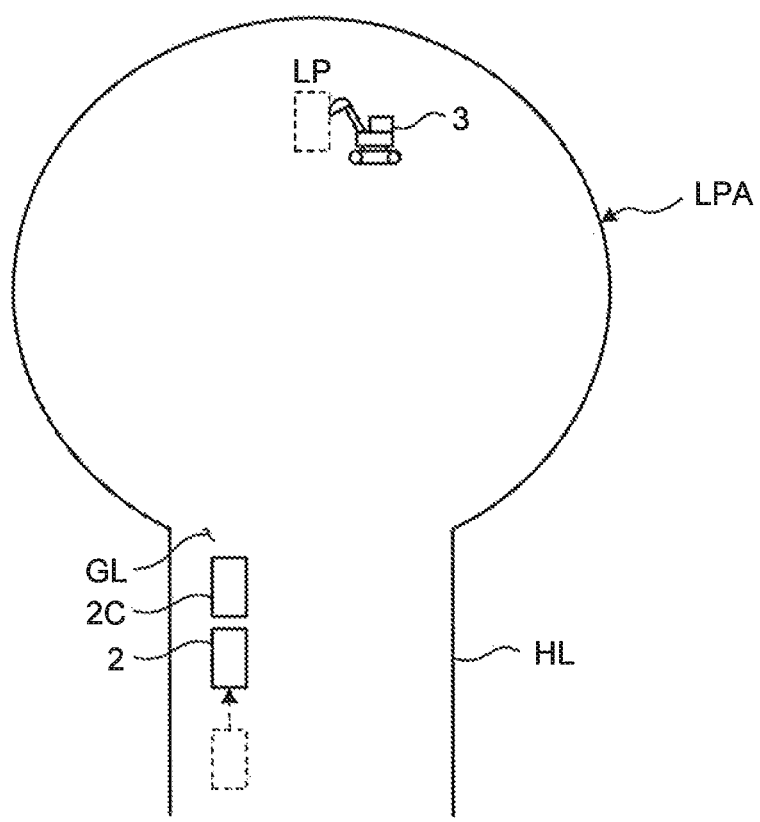
FIG. 9 is a schematic diagram illustrating an example of an operation of a dump truck according to the present embodiment.

In the present embodiment, the number of dump trucks 2 that can be assigned to (enter) the loading area LPA is limited. Therefore, when there are already a predetermined number of dump trucks 2 in the loading area LPA, the dump truck 2 that has arrived at the entrance GL of the loading area LPA stands by (stops) at the entrance GL until at least one of the dump trucks 2 in the loading area LPA moves to outside the loading area LPA. After at least one of the dump trucks 2 in the loading area LPA moves to outside the loading area LPA and the standby state of the dump truck 2 that has been in the standby state at the entrance GL is released, the dump truck 2 at the entrance GL moves to the loading position LP of the loading area LPA. Further, when there are already a predetermined number of dump trucks 2 in the loading area LPA, the timing at which the standby state of the dump truck 2 that has arrived at the entrance GL of the loading area LPA is released can be the time when at least one of the dump trucks 2 in the loading area LPA has moved to outside the loading area LPA and can be the time when the dump truck 2 that has finished the loading operation of loading the stuff at the loading position LP has started moving from the loading position LP. FIG. 9 is a schematic diagram illustrating an example of the loading area LPA. The loading operation is performed by the loading machine 3 with respect to the dump truck 2 that is located at the loading position LP of the loading area LPA. FIG. 9 illustrates a state in which a dump truck 2C is in the standby state at the entrance GL of the loading area LPA. When the dump truck 2C arrives at the entrance GL and the dump truck 2C stops traveling, the standby operation of the dump truck 2C at the entrance GL is started. It is likely that the next dump truck 2 arrives at behind the dump truck 2C that is in the standby state at the entrance GL of the loading area LPA. When the dump truck 2C is in the standby state at the entrance GL, the dump truck 2 that has arrive at behind the dump truck 2C stops at a position separated from the dump truck 2C by a predetermined distance (about 5 m to 10 m), and stands by at the position.

Further, the dump truck 2 may be in the standby state at the entrance GL until the dump truck 2C ahead enters the loading area LPA or until a predetermined time passes after the dump truck 2C ahead enters the loading area LPA and starts the loading operation at the loading position LP. In addition, the loading position LP may be changed in the loading area LPA due to a digging situation, and hence the dump truck 2 may be in the standby state at the entrance GL of the loading area LPA until the traveling path CS corresponding to the changed loading position LP is generated.

The GPS position of the dump truck 2C is detected by the position detection device 29 mounted on the dump truck 2C, and the GPS position of the dump truck 2 is detected by the position detection device 29 mounted on the dump truck 2. The detection result of each of the position detection device 29 of the dump truck 2C and the position detection device 29 of the dump truck 2 is outputted to the processing device 12 via the communication system 9. The processing device 12 can determine whether or not the dump truck 2C has arrived at the entrance GL based on the detection result of the position detection device 29 of the dump truck 2C. Further, the processing device 12 can determine whether the dump truck 2 has arrived at behind the dump truck 2C that had been in the standby state at the entrance GL based on the detection result of the position detection device 29 of the dump truck 2C and the detection result of the position detection device 29 of the dump truck 2. In the present embodiment, the processing device 12 determines that the dump truck 2 has arrived at the entrance GL when the dump truck 2 has arrived at behind the dump truck 2C that had been in the standby state at the entrance GL.

Further, the processing device 12 defines the time when the dump truck 2 in the unloaded state has arrived at behind the dump truck 2C that had been in the standby state at the entrance GL as the time when the dump truck 2 has arrived at the entrance GL. In the present embodiment, the processing device 12 defines the time when the dump truck 2 has arrived at behind the dump truck 2C that had been in the standby state at the entrance GL as the end time Te4 of the unloaded traveling operation of the dump truck 2.

When the dump truck 2 has arrived at behind the dump truck 2C that had been in the standby state at the entrance GL and the dump truck 2 has stopped traveling, the standby operation of the dump truck 2 at the entrance GL is started (Step SA9). The processing device 12 defines the time when the dump truck 2 has arrived at behind the dump truck 2C that had been in the standby state at the entrance GL as a start time Ts5 of an entrance standby operation of the dump truck 2. That is, in the present embodiment, the end time Te4 of the unloaded traveling operation is the same as the start time Ts5 of the entrance standby operation.

After at least one of the dump trucks 2 in the loading area LPA has moved to outside the loading area LPA and the dump truck 2 that had been in the standby state at the entrance GL has been allowed to enter the loading area LPA, the processing device 12 outputs (transmits) a traveling start command signal to the dump truck 2 that had been in the standby state at the entrance GL. With this operation, the standby state of the dump truck 2 is released, and the entrance standby operation is ended (Step SA10). The dump truck 2 for which the standby state is released starts traveling, and enters the loading area LPA from the entrance GL along the traveling path CS.

The processing device 12 defines the time when the dump truck 2 that had been in the standby state at the entrance GL has started (restarted) traveling as an end time Te5 of the entrance standby operation of the dump truck 2. The processing device 12 defines the end time Te5 based on the position information of the dump truck 2 outputted from the position detection device 29. When the dump truck 2 for which the standby state is released starts traveling, the position of the dump truck 2 is changed, and hence the processing device 12 can determine whether or not the dump truck 2 has departed from the standby position of the entrance GL based on the information on the GPS position of the dump truck 2 outputted from the position detection device 29. The processing device 12 determines whether or not the dump truck 2 has started moving from the standby position of the entrance GL based on the detection result of the position detection device 29, and defines the time when the dump truck 2 has started moving from the standby position of the entrance GL as the end time Te5 of the entrance standby operation of the dump truck 2. Further, the processing device 12 can define the time when the standby state of the dump truck 2 at the entrance GL is released and a traveling start command signal is outputted as the end time Te5.

After the entrance standby operation is ended, the dump truck 2 starts a spot operation (Step SA1). The spot operation refers to an operation of moving to the loading position LP of the loading area LPA from the release of the standby state at the standby position of the entrance GL. In the present embodiment, the processing device 12 defines the time when the dump truck 2 has started moving from the standby position of the entrance GL as a start time Ts6 of the spot operation based on the position information of the dump truck 2 outputted from the position detection device 29. That is, in the present embodiment, the end time Te5 of the entrance standby operation is the same as the start time Ts6 of the spot operation. Further, the processing device 12 can define the time when the standby state of the dump truck 2 at the entrance GL is released and the traveling start command signal is outputted as the start time Ts6. In addition, in the present embodiment, when there are already a predetermined number of dump trucks 2 in the loading area LPA, the dump truck 2 that has arrived at the entrance GL of the loading area LPA becomes in the standby state; however, when the number of dump trucks 2 in the loading area LPA is not the predetermined number (when there is a vacancy in the loading area LPA), the dump truck 2 that has arrived at the entrance GL of the loading area LPA can enter the loading area LPA without stopping (standing by) at the entrance GL and travel to the loading position LP. In this case, the time when the dump truck 2 passed the entrance GL of the loading area LPA can be defined as the end time Te4 of the unloaded traveling operation of the dump truck 2 or can be defined as the start time Ts6 of the spot operation.

The dump truck 2 travels along the traveling path CS generated by the processing device 12 and moves to the loading position LP from the entrance GL. With this operation, the spot operation is ended (Step S12). The processing device 12 defines the time when the dump truck 2 has arrived at the loading position LP as an end time Te6 of the spot operation. The processing device 12 determines whether or not the dump truck 2 has arranged at the loading position LP based on the information on the GPS position of the dump truck 2 outputted from the position detection device 29, and defines the time when the dump truck 2 has been arranged at the loading position LP as the end time Te6 of the spot operation of the dump truck 2.

The spot operation can be divided into a first spot operation and a second spot operation. For example, when the dump truck 2 enters the loading position LP, it is likely that a so-called switch back operation is performed in which, after the dump truck 2 enters the loading area LPA from the entrance GL in a state in which a front portion of the dump truck 2 is headed for the loading position LP, a steering operation of the dump truck 2 is performed in a manner that a rear portion of the dump truck 2 is headed for the loading position LP, and then the dump truck 2 enters the loading position LP while backing the dump truck 2. In such a case, the dump truck 2 may be in the standby state at a predetermined position (switch back position) of the loading area LPA distant from the loading position LP. In this case, the processing device 12 can set an operation of the dump truck 2 to move to the switch back position after the standby state at the standby position of the entrance GL is released as a first spot operation and an operation of the dump truck 2 to move to the loading position LPA from the switch back position as a second spot operation. The processing device 12 can define a start time and an end time of the first spot operation of the dump truck 2 and a start time and an end time of the second spot operation of the dump truck 2.

In the present embodiment, the end time Te6 of the spot operation is the same as the start time Ts1 of the loading operation. The loading operation is performed with respect to the dump truck 2 that has been arranged at the loading position LP.

Further, when the dump truck 2 stops traveling on the haul road HL, the processing device 12 defines a start time Ts7 and an end time Te7 of a traveling stop operation of the dump truck 2. The processing device 12 can define the start time Ts7 and the end time Te7 of the traveling stop operation on the haul road HL based on the GPS position of the dump truck 2 outputted from the position detection device 29. When the dump truck 2 stops traveling, the GPS position of the dump truck 2 is not changed, and when the dump truck 2 that has been in a traveling stop state starts traveling, the GPS position of the dump truck 2 is changed, and hence, the processing device 12 can define the start time Ts7 and the end time Te7 of the traveling stop operation based on the GPS position of the dump truck 2. Further, the processing device 12 can define the start time Ts7 and the end time Te7 of the traveling stop operation based on the detection result of the speed sensor 27 of the dump truck 2.

One cycle has been described so far. The same cycle operation is then repeated. Further, in the mine, a plurality of dump trucks 2 is operated, and the start times (Ts1 to Ts7) and the end times (Te1 to Te7) of each operation are defined for each of the plurality of dump trucks 2. Each of the plurality of dump trucks 2 has an identifier (ID), and the processing device 12 defines the start times (Ts1 to Ts7) and the end times (Te1 to Te7) of each operation for each of the plurality of dump trucks 2 in association with the identifier.

The processing device 12 can derive the time required for each operation based on the start times (Ts1 to Ts7) and the end times (Te1 to Te7) of each operation for the plurality of dump trucks 2. For example, the processing device 12 can calculate an entrance standby time of the dump truck 2 from the arrival time when the dump truck 2 arrives at the entrance GL until when the standby state at the entrance GL is released, based on the start time Ts5 and the end time Te5.

(Example of Defining Start Time of Loading Operation)

In the above-mentioned embodiment, the loading position LP is determined on one side of the loading machine 3, the dump trucks 2 in an unloaded state are sequentially arranged at the loading position LP, and the time when the dump truck 2 in the unloaded state is arranged at the loading position LP is set to the start time Ts1 of the loading operation. In the loading area LPA, it is likely that the loading positions LP are respectively determined on both sides of the loading machine 3, and the dump truck 2 is arranged on one side of the loading position LP during a loading operation for the dump truck 2 arranged on the other side of the loading position LP. An example of defining a start time of the loading operation when the loading positions LP are respectively determined on both sides of the loading machine 3 and the loading operation of loading the stuff is performed for each of the dump trucks 2 respectively arranged at the loading positions LP on both sides (both side loading operation) is described below.

Figure 10:
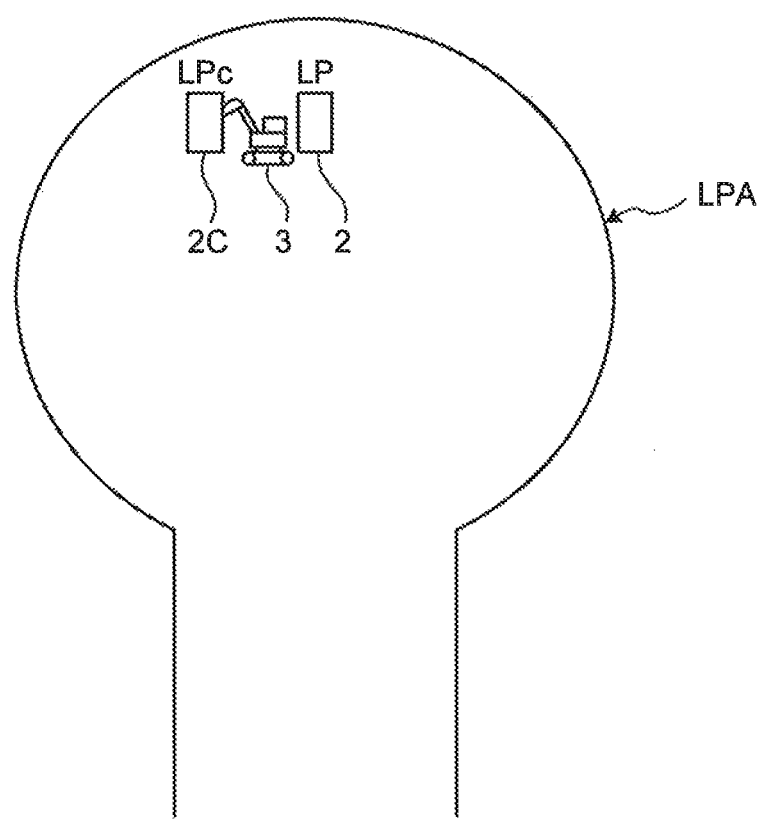
FIG. 10 is a schematic diagram illustrating an example of an operation of a dump truck according to the present embodiment.

FIG. 10 is a schematic diagram illustrating an example of the loading area LPA, and FIG. 11 is a flowchart illustrating an example of the loading operation. As illustrated in FIG. 10, in the present embodiment, the loading operation is performed by the loading machine 3 for a dump truck 2C that is arranged at a loading position LPc of the loading area LPA (Step SC1). The loading position LPc is determined on one side of the loading machine 3. The information on the GPS position of the dump truck 2C when the loading operation is performed at the loading position LPc is outputted to the processing device 12 of the management apparatus 10 via the communication system 9.

When the loading operation for the dump truck 2C is ended, the input device 31 is operated by an operator WM of the loading machine 3 (Step SC2). The operator WM presses (operates) an input button when the loading operation for the dump truck 2C is ended. The operation signal generated by the input device 31 is outputted to the processing device 12 of the management apparatus 10 and the processing device 20 of the dump truck 2C via the communication system 9.

The processing device 12 defines an end time Te1 of the loading operation of the dump truck 2C based on the operation signal generated by the input device 31 when the loading operation is ended (Step SC3). The end time Te1 of the loading operation of the dump truck 2C includes a start time Ts2 of the loaded traveling operation of the dump truck 2C.

The operation signal generated by the input device 31 at the time when the loading operation for the dump truck 2C is ended (Step SC2), includes a depart command signal for the dump truck 2C from the loading position LPc. When the operation signal generated by the input device 31 is inputted to the processing device 20 of the dump truck 2C via the communication system 9, the dump truck 2C departs from the loading position LPc toward the dumping area DPA. Further, the processing device 12 of the management apparatus 10 received the operation signal from the input device 31 can issue a command to the dump truck 2C to depart from the loading position LPc via the communication system 9.

After the loading operation for the dump truck 2C is ended, the loading operation of loading the stuff is performed by the loading machine 3 for the dump truck 2 that has been arranged at the loading position LP (Step SA1). In the present embodiment, the dump truck 2 arrives at the loading position LP before the loading operation for the dump truck 2C is ended (Step SA0). The loading position LP is a position different from the loading position LPc, and is determined on the other side of the loading machine 3. That is, in the present embodiment, the dump truck 2 is arranged at the loading position LP that is different from the loading position LPc during the loading operation of loading the stuff on the dump truck 2C that is arranged at the loading position LPc. The dump truck 2 that has arrived at the loading position LP stands by (stops traveling) at the loading position LP until the loading operation for the dump truck 2C is ended.

As illustrated in FIG. 10, the loading position LPc is a position different from the loading position LP, and in the present embodiment, the loading position LPc is determined on one side of the loading machine 3 and the loading position LP is determined on the other side of the loading machine 3. The loading machine 3 turns around after the loading operation for the dump truck 2C that is arranged at the loading position LPC is ended, and performs the loading operation for the dump truck 2 that is already arranged at the loading position LP during the loading operation for the dump truck 2C. The loading position LPc and the loading position LP are included in, for example, the traveling path CS, and defined by the processing device 12. The loading machine 3 respectively performs the loading operations for the dump truck 2C and the dump truck 2 that are respectively arrange on both sides (both side loading operation).

The arrival time when the dump truck 2 has arrived at the loading position LP is the end time Te6 of the spot operation of the dump truck 2, which is obtained based on the information on the GPS position of the dump truck 2. The processing device 12 obtains the GPS position of the dump truck 2 based on the detection result of the position detection device 29, and defines (sets) the arrival time Te6 based on the GPS position of the dump truck 2. The processing device 12 can define the arrival time Te6 based on at least one of the detection result of the speed sensor 27 or the information on the GPS position of the dump truck 2.

The operation signal generated by the input device 31 at Step SC2 is a notification signal for notifying an end of the loading operation for the dump truck 2C and a depart command signal for the dump truck 2C from the loading position LPC, and at the same time, a notification signal for notifying a start of the loading operation for the dump truck 2. The operation signal generated by the input device 31 is outputted to the processing device 12 of the management apparatus 10 and the processing device 20 of the dump truck 2 via the communication system 9. The processing device 12 defines (sets) the start time Ts1 of the loading operation for the dump truck 2 based on the operation signal generated by the input device 31 at the time when the loading operation for the dump truck 2C is ended. That is, in the present embodiment, the processing device 12 defines the start time Ts1 of the loading operation for the dump truck 2 based on the operation signal generated by the input device 31 at the time of starting the loading operation.

In the present embodiment, the time from the arrival time Te6 when the dump truck 2 has arrived at the loading position LP to the start time Ts1 when the loading operation for the dump truck 2 is started is set to the standby time (stop time) of the dump truck 2 at the loading position LP. As described above, the arrival time Te6 is defined based on the detection result of the position detection device 29, and the start time Ts1 is defined based on the operation signal generated by the input device 31 when the loading operation for the dump truck 2C is ended. The processing device 12 defines the time when the operation signal is inputted from the input device 31 in a state in which the dump truck 2 is at the loading position LP as the start time Ts1. That is, the start time Ts1 is the time when the input device 31 is operated and the operation signal is generated in a state in which the loading position LP defined by the processing device 12 and the GPS position of the dump truck 2 detected by the position detection device 29 match each other. The processing device 12 derives the standby time from the arrival time Te6 when the dump truck 2 has arrived at the loading position LP to the start time Ts1 of the loading operation based on the detection result of the position detection device 29 and the operation signal generated by the input device 31 when the loading operation for the dump truck 2C is ended.

When the loading operation for the dump truck 2 is ended, the input device 31 is operated by the operator WM of the loading machine 3 (Step SA2). The operation signal generated by the input device 31 is outputted to the processing device 12 of the management apparatus 10 and the processing device 20 of the dump truck 2 via the communication system 9. The processing device 12 defines an end time Te1 of the loading operation for the dump truck 2 based on the operation signal generated by the input device 31 when the loading operation for the dump truck 2 is ended.

In the present embodiment, the operation signal generated by the input device 31 when the loading operation for the dump truck 2 is ended (Step SA2) includes a depart command signal for the dump truck 2 from the loading position LP. The processing device 12 defines a start time Ts2 of the loaded traveling operation of the dump truck 2 based on the operation signal generated by the input device 31 when the loading operation for the dump truck 2 is ended (Step SA2). The processing device 12 defines the time when the operation signal is generated by the input device 31 (time when the operation signal is inputted to the processing device 12) as the start time Ts2 (Step SA3). When the operation signal generated by the input device 31 is inputted to the processing device 20 of the dump truck 2 via the communication system 9, the dump truck 2 departs from the loading position LP toward the dumping area DPA.

When the next dump truck 2 arrives at the loading position LPc during the loading operation for the dump truck 2, the start time Ts1 of the loading operation for the next dump truck 2 is defined based on the operation signal generated by the input device 31 when the loading operation for the dump truck 2 is ended (Step SA2).

(Vehicle Assignment Command)

The processing device 12 outputs an assignment command for the dump truck 2 in the mine to the dump truck 2 based on the position information of each of the plurality of dump trucks 2. Further, a signal on the assignment command can be outputted based on an operation of the input device 17 by an operator or can be automatically outputted from a calculation of the assignment of the dump truck 2 by the processing device 12. The processing device 12 defines the start time and the end time of each operation of each of the plurality of dump trucks 2 based on the position information of the dump truck 2, and accurately figures out position information and time information (start time and end time) of the dump truck 2 corresponding to each operation of the dump truck 2. Therefore, the processing device 12 can perform a proper assignment management based on the position information and the time information of the dump truck 2 corresponding to each operation of the dump truck 2 and output a vehicle assignment command (assignment command). For example, when there is a plurality of loading areas LPA, processing performance (for example, the number of dump trucks 2 that can be loaded per unit time) of the loading machine 3 in each of the loading areas LPA may differ. In such a case, for example, if the number of dump trucks 2 assigned to the loading machine 3 that has low processing performance is increased, the number of dump trucks 2 that should stand by for the loading operation is increased so that the productivity in the mine may be decreased. In the present embodiment, the processing device 12 can derive the number of dump trucks 2 to be assigned to each of the loading areas LPA (loading machine 3) based on the accurate time information of the dump truck 2 corresponding to each operation of the dump truck 2 such that the decrease of the productivity in the mine is suppressed (the number of dump trucks 2 that should stand by for the loading operation is not increased). The processing device 12 can output the derived assignment of the dump truck 2 to each of the plurality of dump trucks 2.

Further, when there is a plurality of haul roads HL that leads to the plurality of loading areas LPA and dumping areas DPA, it is likely that traveling times (loaded traveling time and unloaded traveling time) of the dump truck 2 on the haul roads HL differ for different haul roads HL depending on characteristics (slope angle, the number of curves, road surface condition, and the like) of the haul roads HL. In addition, the traveling time of the dump truck 2 may differ on the haul road HL depending on an operation condition such as a repair operation of the haul road HL. Further, the traveling time of the dump truck 2 on the haul road HL may differ depending on the number of intersects on the haul road HL. Moreover, when the dump truck 2 travels to pass an intersect of the haul road HL, the traveling time of the dump truck 2 from a first position of the haul road HL to the intersect and the traveling time of the dump truck 2 from the intersect of the haul road HL to a second position may differ from each other depending on the characteristics of the haul road HL and the operation condition. In addition, for example, when the haul road HL is split from the intersect of the haul road HL to a haul road HL that leads to a first loading area LPA and a haul road HL that leads to a second loading area LPA, the traveling time of the dump truck 2 traveling along the haul road HL that leads to the first loading area LPA and the traveling time of the dump truck 2 traveling along the haul road HL that leads to the second loading area LPA may differ from each other depending on the characteristics and the operation conditions of the haul road HL that leads to the first loading area LPA and the haul road HL that leads to the second loading area DPA. Further, for example, when the haul road HL is split from the intersect of the haul road HL to haul road HL that leads to a first dumping area DPA and a haul road HL that leads to a second dumping area DPA, the traveling time of the dump truck 2 traveling along the haul road HL that leads to the first dumping area DPA and the traveling time of the dump truck 2 traveling along the haul road HL that leads to the second dumping area DPA may differ from each other depending on the characteristics and the operation conditions of the haul road HL that leads to the first dumping area DPA and the haul road HL that leads to the second dumping area DPA. That is, there may be a situation where the traveling speed of the dump truck 2 should be limited depending on the characteristics and the site condition of the haul road HL, and as a result, the traveling time of the dump truck 2 on the haul road HL is changed. In the present embodiment, because the operation, the position information, and the time information of the dump truck 2, such as the time required for the dump truck 2 to travel (loaded travel and unloaded travel) on each of the haul roads HL and the like, are accurately figured out in association with each other, the processing device 12 can perform a proper vehicle assignment management or assignment instruction not to cause a slow travel or a traffic jam of the dump trucks 2. Further, for example, when the haul road HL is split from the intersect of the haul road HL to a haul road HL that leads to a first loading area LPA and a haul road HL that leads to a second loading area LPA, an assignment command can be outputted to the dump truck 2 to cause the dump truck 2, which has departed the dumping area DPA and is supposed to travel toward the first loading area LPA passing the intersect of the haul road HL, to travel along the haul road HL toward the second loading area LPA not to cause a slow travel or a traffic jam of the dump truck 2 on the haul road HL that leads to the first loading area LPA or at the entrance of the first loading area LPA. Moreover, for example, when the haul road HL is split from the intersect of the haul road HL to haul road HL that leads to a first dumping area DPA and a haul road HL that leads to a second dumping area DPA, an assignment command can be outputted to the dump truck 2, which has departed the loading area LPA and is supposed to travel toward the first dumping area DPA passing the intersect of the haul road HL, to travel along the haul road HL toward the second dumping area DPA not to cause a slow travel or a traffic jam of the dump truck 2 on the haul road HL that leads to the first dumping area DPA.

In addition, for example, when the dump truck 2 cannot travel at a high speed in a rain, if the number of dump trucks 2 given to the mine is not enough, there may be a time interval between the end of the loading operation for the dump truck 2 by the loading machine 3 and the arrival of the next dump truck 2 at the loading position LP, and hence the loading machine 3 becomes in a standby state until the next dump truck 2 arrives so that the productivity is decreased. In the present embodiment, the processing device 12 accurately figures out the position information and the time information (time required for an operation) corresponding to each operation of the dump truck 2, and hence the processing device 12 can determine the proper number of dump trucks 2 to be given to the mine based on those pieces of information. Similarly, when the number of dump trucks 2 given to the mine is surplus, the processing device 12 can determine the proper number of dump trucks 2 to be given to the mine.

As described above, according to the present embodiment, a start time and an end time of a predetermined operation of the dump truck 2 are defined based on the position information of the dump truck 2, and hence the start time and the end time of the predetermined operation of the dump truck 2 corresponding to the position information of the dump truck 2 can be accurately obtained.

That is, according to the present embodiment, in association with each of a plurality of operations of the dump truck 2, the position information and the time information of the dump truck 2 for which the operation is performed are accurately obtained, and hence an accurate vehicle assignment condition (assignment condition and operation condition) of the dump trucks 2 in the mine can be acquired. Therefore, a proper vehicle assignment management (assignment management) can be performed such that the decrease of the productivity in the mine can be suppressed, based on the acquired vehicle assignment condition.

That is, for example, when only the time required for a predetermined operation of the dump truck 2 is acquired, it is likely to be difficult to immediately perform a vehicle assignment management not to increase the number of dump trucks 2 that should stand by for the loading operation or a vehicle assignment management not to cause a traffic jam on the haul road HL. According to the present embodiment, the processing device 12 can figure out how much time is required to perform a specific operation at a specific position of the mine for each of the dump trucks 2, and hence the processing device 12 can cause a plurality of dump trucks 2 to respectively travel toward proper sites (loading area LPA and the dumping area DPA) not to cause a long standby state or a traffic jam.

Further, in the present embodiment, when the dump truck 2 has arrived at a position (standby position) behind the dump truck 2C that had been in the standby state at the entrance GL of the loading area LPA and separated from the dump truck 2C by a predetermined distance, it is determined that the dump truck 2 has arrived at the entrance GL. Therefore, even when the dump truck 2C stands by at the entrance GL, the unloaded traveling time of the dump truck 2 can be accurately obtained. Accordingly, a proper vehicle assignment management can be performed not to increase the number of dump trucks 2 that should stand by for the loading operation in each of a plurality of loading areas LPA.

Moreover, as described with reference to FIGS. 10 and 11, when the loading positions LP are respectively determined on both sides of the loading machine 3, if the next dump truck 2 arrives at the loading position LP while the loading operation is being performed for the previous dump truck 2C at the loading area LP (loading position LPc), it is configured to define the start time Ts1 of the loading operation for the dump truck 2 based on the operation signal generated by the input device 31 when the loading operation for the dump truck 2C is ended, and hence a proper vehicle assignment management can be performed considering the standby time from the arrival time Te6 when the dump truck 2 has arrive at the loading position LP to the start time Ts1.

In addition, according to the present embodiment, the operation signal generated by the input device 31 when the loading operation is ended is used to define the end time Te1 and the start time Ts2, and at the same time, serves as the depart command signal for the dump truck 2 from the loading position LP. Therefore, unless the input device 31 is operated, the dump truck 2 does not depart from the loading position LP and stays at the loading position LP. Accordingly, it is possible to prevent the operator WM from forgetting to operate the input device 31.

Although the position information of the dump truck 2 is detected by using the GPS in the above-mentioned embodiments, a method of detecting the position information of the dump truck 2 is not limited to the method of using the GPS. For example, the position information of the dump truck 2 can also be obtained by a dead reckoning method by using a gyro sensor and a speed sensor mounted on the dump truck 2.

Further, in the above-mentioned embodiment, the processing device 12 can obtain the time required for one cycle (cycle time) from the time required for each of a plurality of operations of the dump truck 2. For example, the processing device 12 can obtain the cycle time from the start time Ts1 and the start time Ts1 after one cycle. In addition, the processing device 12 can also obtain the cycle time from the start time Ts2 (end time Te1) defined based on the operation signal generated by the input device 31 and the start time Ts2 (end time Te1) after one cycle.

Further, it is likely that the site condition (digging condition, operation condition, and the like) of the mine is changed from moment to moment, and the traveling stop time on the haul road HL is changed accordingly. When it is desired to obtain the cycle time (cycle time that does not include the traveling stop time on the haul road HL) that is not affected by the site condition, it suffices to obtain a sum of the times required for each operation (dumping operation time, unloaded traveling time, entrance standby time, spot time, and loading operation time).

Further, for example, as illustrated in FIG. 12, the cycle time (reference cycle time) that is not affected by the site condition can also be obtained by subtracting the traveling stop time on the haul road HL from the time between the start time Ts1 and the start time Ts1 after one cycle (complete cycle time).

Further, the cycle time can be obtained by subtracting the traveling stop time on the haul road HL and the entrance standby time from the complete cycle time.

When the loading positions LP are respectively provided on both sides of the loading machine 3 as described with reference to FIGS. 10 and 11, the cycle time can be obtained by subtracting the traveling stop time on the haul road HL and the standby time at the loading position LP (time from the arrival time Te6 with respect to the loading position LP to the start time Ts1 of the loading operation) from the complete cycle time, or alternatively, the cycle time can be obtained by subtracting the traveling stop time on the haul road HL, the entrance standby time, and the standby time at the loading position LP from the complete cycle time.

Further, the vehicle assignment management of the dump truck 2 in the mine (the number of dump trucks 2 to be given to the mine) can also be performed based on the cycle time that has not been affected by the site situation.

In the above-mentioned embodiments, the dump truck 2 can be a so-called manned dump truck that is operated by an operation of an operator (driver).

The constituent elements of the above-mentioned embodiments include elements that can be easily conceived by a person having ordinary skill in the art, substantially the same element, i.e., elements within so-called equivalents. Further, the constituent elements of the above-mentioned embodiments can be combined as appropriate. In addition, there may be a case where a part of the constituent elements is not used.

REFERENCE SIGNS LIST

1 MANAGEMENT SYSTEM
2 DUMP TRUCK (HAUL MACHINE)
3 LOADING MACHINE
9 COMMUNICATION SYSTEM
10 MANAGEMENT APPARATUS
12 PROCESSING DEVICE
13 STORAGE DEVICE
18 WIRELESS COMMUNICATION DEVICE
20 PROCESSING DEVICE
25 STORAGE DEVICE
28 WIRELESS COMMUNICATION DEVICE
29 POSITION DETECTION DEVICE
29A ANTENNA
30 PROCESSING DEVICE
31 INPUT DEVICE
32 WIRELESS COMMUNICATION DEVICE
33 POSITION DETECTION DEVICE
39 STORAGE DEVICE
DP DUMPING POSITION
DPA DUMPING AREA
HL HAUL ROAD
LP LOADING POSITION
LPA Loading area

The invention claimed is:

1. A management system of a mining machine, comprising:
a first detection unit to detect position information of a first haul machine to travel along a haul road that leads to a loading area of a mine;
a second detection unit to detect position information of a second haul machine to travel along the haul road;
a processing device, which is placed in a different position from those of the first and second haul machines, to receive a detection result from each of the first detection unit and the second detection unit; and
a communication device to communicate with the first and second haul machines, wherein
the processing device specifies an end of an unloaded traveling operation of the second haul machine when the second haul machine arrives at a position behind the first haul machine that is in a standby state at the entrance based on the detected position information of the first and second haul machines, and outputs a vehicle deployment instruction to a haul machine in the mine based on time information corresponding to the specified end of unloaded traveling operation in order to control operation of the haul machine, the haul machine being deployed in response to the vehicle deployment instruction, the standby state being a state in which a haul machine is stopped and awaiting a vehicle deployment instruction to move to a loading position of the loading area.

2. The management system according to claim 1, wherein the processing device defines a time when the second haul machine arrives at the position behind the first haul machine as an arrival time of the second haul machine at the entrance, and outputs a command via the communication device to the second haul machine to control a traveling operation thereof according to the defined time.

3. The management system according to claim 1, wherein the second haul machine stops traveling when the second haul machine arrives at the position behind the first haul machine, to stand by at the entrance of the loading area, and then to move from the entrance to a loading position of the loading area, and
the processing device defines a start time and an end time of an operation of the second haul machine moving to the loading position of the loading area after a standby state at a standby position of the entrance is released, based on the position information of the second haul machine outputted from the second detection unit, and to output a command via the communication device to the second haul machine to control a traveling operation thereof according to the defined start time and end time.

4. The management system according to claim 3, wherein the processing device defines a start time and an end time of at least one of an operation of the second haul machine traveling in a state in which a stuff is not loaded, an operation of a loading machine loading the stuff on the second haul machine at the loading position, and an operation of the second haul machine traveling in a state in which the stuff is loaded, based on the position information of the second haul machine outputted from the second detection unit.

5. The management system according to claim 3, wherein the processing device calculates a standby time of the second haul machine from the arrival time to a time when the standby state is released.

6. The management system according to claim 1, wherein the processing device calculates a time required for a cycle operation of the second haul machine that travels back and forth between the loading area and a dumping area where an operation of dumping the stuff is performed.

7. A computer-implemented management method of a mining machine, comprising:
   detecting via a first detection unit position information of a first haul machine to travel along a haul road that leads to a loading area of a mine;
   detecting via a second detection unit position information of a second haul machine to travel along the haul road;
   specifying, via a processing device which is placed in a different position from those of the first and second haul machines, an end of an unloaded traveling operation of the second haul machine when the second haul machine arrives at a position behind the first haul machine that is in a standby state at the entrance based on the detected position information of the first and second haul machines, the standby state being a state in which a haul machine is stopped and awaiting a vehicle deployment instruction to move to a loading position of the loading area; and
   outputting a vehicle deployment instruction to a haul machine in the mine based on time information corresponding to the end of unloaded traveling specified operation in order to control operation of the haul machine, the haul machine being deployed in response to the vehicle deployment instruction.

8. A control system comprising:
first and second unmanned haul machines each having a communication device to receive one or more commands from a remote location and a processing device to control the operation of the haul machine according to the one or more commands; and
a management system of a mining machine comprising:
   a first detection unit configured to detect position information of a first haul machine to travel along a haul road that leads to a loading area of a mine;
   a second detection unit configured to detect position information of a second haul machine to travel along the haul road;
   a processing device to receive a detection result from each of the first detection unit and the second detection unit; and
   a communication device to communicate with the first and second haul machines,
wherein the processing device of the management system specifies an end of an unloaded traveling operation of the second haul machine when the second haul machine arrives at a position behind the first haul machine that is in a standby state at the entrance based on the detected position information of the first and second haul machines, and outputs a vehicle deployment instruction to a haul machine in the mine based on time information corresponding to the specified end of unloaded traveling operation in order to control operation of the haul machine, the haul machine being deployed in response to the vehicle deployment instruction, the standby state being a state in which a haul machine is stopped and awaiting a vehicle deployment instruction to move to a loading position of the loading area.

* * * * *